(12) United States Patent
Emukpere et al.

(10) Patent No.: US 12,393,175 B2
(45) Date of Patent: Aug. 19, 2025

(54) SYSTEMS AND METHODS FOR SKILL LEARNING WITH MULTIPLE CRITICS

(71) Applicant: Naver Corporation, Gyeonggi-do (KR)

(72) Inventors: David Emukpere, Auvergne-Rhone-Alpes (FR); Bingbing Wu, Auvergne-Rhone-Alpes (FR); Julien Perez, Auvergne-Rhone-Alpes (FR)

(73) Assignee: Naver Corporation (KR)

( * ) Notice: Subject to any disclaimer, the term of this patent is extended or adjusted under 35 U.S.C. 154(b) by 145 days.

(21) Appl. No.: 18/511,829

(22) Filed: Nov. 16, 2023

(65) Prior Publication Data

US 2025/0164966 A1  May 22, 2025

(51) Int. Cl.
*G05B 19/4155* (2006.01)
*B25J 9/16* (2006.01)

(52) U.S. Cl.
CPC .......... *G05B 19/4155* (2013.01); *B25J 9/163* (2013.01); *G05B 2219/39376* (2013.01)

(58) Field of Classification Search
CPC ....... G05B 19/4155; G05B 2219/39376; B25J 9/163
USPC .................. 700/245–264; 318/568.11–568.25
See application file for complete search history.

(56) References Cited

U.S. PATENT DOCUMENTS

| | | | | |
|---|---|---|---|---|
| 6,532,454 | B1 * | 3/2003 | Werbos | G06N 20/00 706/14 |
| 10,580,424 | B2 * | 3/2020 | Mirzahasanloo | H04W 84/12 |
| 10,878,314 | B2 * | 12/2020 | Nagaraja | G06N 3/063 |
| 11,478,927 | B1 * | 10/2022 | Kranski | B25J 9/161 |
| 11,691,278 | B2 * | 7/2023 | Kranski | B25J 13/086 700/245 |
| 11,833,691 | B2 * | 12/2023 | Hajash | B25J 9/1607 |
| 11,922,287 | B2 * | 3/2024 | Li | G06N 3/042 |
| 11,934,176 | B2 * | 3/2024 | Woehlke | G05D 1/0221 |
| 12,030,657 | B1 * | 7/2024 | Al-Nadawi | F01D 15/10 |
| 12,070,853 | B2 * | 8/2024 | Robbins | B25J 17/00 |
| 12,117,805 | B2 * | 10/2024 | Zia | G05B 19/4155 |
| 12,157,226 | B2 * | 12/2024 | Kranski | B25J 9/161 |
| 2018/0260692 | A1 * | 9/2018 | Nagaraja | G06N 3/045 |
| 2019/0019082 | A1 * | 1/2019 | Dasgupta | G06N 3/063 |
| 2019/0371348 | A1 * | 12/2019 | Shahbazi Mirzahasanloo | H04W 84/12 |

(Continued)

OTHER PUBLICATIONS

Barber, D. et al., "The IM Algorithm☐: A Variational Approach to Information Maximization", NIPS, 2003, https://aivalley.com/Papers/MI_NIPS_final.pdf.

(Continued)

*Primary Examiner* — Jaime Figueroa
(74) *Attorney, Agent, or Firm* — Mughal Gaudry & Franklin PC

(57) ABSTRACT

Systems and methods are disclosed for determining a policy to recommend transition in a position-representing space for a robotic device using a multi-critic architecture. To learn policy in a multi-critic architecture, a set of critics is defined pertaining to a position-representing space where each critic corresponds to a different objective function such as reach-reward, discovery-reward, and safety-reward. For each one of the critics of the set of critics, a learned value function in position-representing space is determined. The policy is learned based on the weighted feedback of the learned value functions to recommend transitions that are safe in the position-representing space. The multi-critic architecture minimizes interference between multiple reward functions and learns a safe and stable policy for the robotic device.

20 Claims, 18 Drawing Sheets

(56) References Cited

U.S. PATENT DOCUMENTS

| | | | | |
|---|---|---|---|---|
| 2021/0116888 | A1* | 4/2021 | Roy | G05B 13/0265 |
| 2021/0237266 | A1* | 8/2021 | Kalashnikov | B25J 9/1612 |
| 2021/0341904 | A1* | 11/2021 | Woehlke | G05D 1/0221 |
| 2022/0187847 | A1* | 6/2022 | Cella | G06Q 10/06 |
| 2022/0197247 | A1* | 6/2022 | Cella | G02B 3/14 |
| 2022/0197306 | A1* | 6/2022 | Cella | B29C 64/386 |
| 2022/0281123 | A1* | 9/2022 | Robbins | B25J 9/1671 |
| 2022/0314434 | A1* | 10/2022 | Kranski | B25J 9/163 |
| 2022/0314444 | A1* | 10/2022 | Hajash | B25J 9/1664 |
| 2022/0326664 | A1* | 10/2022 | Kaberg Johard | G06N 3/006 |
| 2023/0078625 | A1* | 3/2023 | Kaehler | B25J 9/1682 700/245 |
| 2023/0109398 | A1* | 4/2023 | Kranski | B25J 9/1615 700/250 |
| 2023/0126906 | A1* | 4/2023 | Kranski | B25J 9/161 700/245 |
| 2023/0256593 | A1* | 8/2023 | Zolna | B25J 9/163 706/21 |
| 2023/0355332 | A1* | 11/2023 | Nagao | A61B 34/70 |
| 2024/0013090 | A1* | 1/2024 | Kanazawa | G06N 3/092 |
| 2024/0038076 | A1* | 2/2024 | Omi | G08G 5/34 |
| 2024/0100694 | A1* | 3/2024 | Handa | B25J 9/1679 |
| 2024/0131698 | A1* | 4/2024 | Jha | B25J 9/1671 |
| 2024/0272618 | A1* | 8/2024 | Zia | G05B 19/4155 |

OTHER PUBLICATIONS

Eysenbach, B. et al., "Diversity Is All You Need: Learning Skills without a Reward Function", arXiv, Oct. 9, 2018. http://arxiv.org/abs/1802.06070.

Gregor, K. et al., "Variational Intrinsic Control", International Conference on Learning Representations, 2017.

Khatib, O. "A unified approach for motion and force control of robot manipulators: The operational space formulation", 1987, https://khatib.stanford.edu/publications/pdfs/Khatib_1987_RA.pdf.

Kim, S. et al., "Safety-Aware Unsupervised Skill Discovery." In 2023 IEEE International Conference on Robotics and Automation (ICRA), 894-900. London, United Kingdom: IEEE, 2023, https://doi.org/10.1109/ICRA48891.2023.10160985.

Laskin, M. et al., "Contrastive Intrinsic Control for Unsupervised Reinforcement Learning", Neural Information Processing Systems, 2022.

Makoviychuk, V. et al., "Isaac Gym: High Performance GPU-Based Physics Simulation For Robot Learning", arXiv, Aug. 25, 2021, http://arxiv.org/abs/2108.10470.

Mysore, S. et al., "Multi-Critic Actor Learning: Teaching RL Policies to Act with Style", In International Conference on Learning Representations, 2022.

Park, S. et al., "Lipschitz-Constrained Unsupervised Skill Discovery", International Conference on Learning Representations, 2022.

Schulman, J. et al., "Proximal Policy Optimization Algorithms", ArXiv:1707.06347 [Cs], Aug. 28, 2017. http://arxiv.org/abs/1707.06347.

Sharma, A. et al., "Dynamics-Aware Unsupervised Discovery of Skills", arXiv, Feb. 14, 2020. http://arxiv.org/abs/1907.01657.

Shi, G. et al., "Recon: Reducing Conflicting Gradients from the Root for Multi-Task Learning", arXiv, Feb. 22, 2023, http://arxiv.org/abs/2302.11289.

Zhao, R. et al., "Mutual Information State Intrinsic Control", 2021, https://doi.org/10.48550/arXiv.2103.08107.

* cited by examiner

700-A

SLIM

700-B

SLIM_ur

700-C

SLIM_nr

700-D

SLIM_no_r

700-E

SLIM_no_d

700-F

SLIM_no_s

SYSTEMS AND METHODS FOR SKILL LEARNING WITH MULTIPLE CRITICS

BACKGROUND

Robots have made valuable contributions to modern society, especially in the arena of smart industry 4.0 where robots are being designed to work alongside humans in shared workspaces, manufacturing plants and healthcare ecosystems. These robots can assist humans with the tasks that not only enhance productivity but also improve safety by using next generation flexible 3D manufacturing, advanced sensors, and real time, fault tolerant systems programming software. Instead of defining explicit rules to engineer learning behaviors for each individual task, modern robots can also learn from data-driven experiences in their ambient environments to autonomously fine tune parameters of an underlying model that controls how the robot moves. Such finetuning can improve a degree to which a robot properly responds to unforeseen events in dynamic and unstructured environments of industry 4.0 and beyond.

However, when dealing with robots that possess a high degree of freedom or operate in continuous state spaces, several significant challenges arise. The large search space of possible actions and configurations can make it a challenging task to explore and discover a set of manipulation strategies in an efficient and effective manner. Additionally, the continuous state space also introduces complexities in planning trajectories and in designing adaptive controllers that can continuously adapt their learning strategies in real time. Moreover, it is also important to ensure the safety of human workers by ensuring that robots reliably operate safely in coworking shared spaces. Providing solutions to these challenges and to enable safe skills discovery will facilitate seamless integration of robots into real-world applications. This, however, may affect the degrees of freedom of the state space of an agent that may subsequently impact the states of objects in the example of manipulating objects.

SUMMARY

Methods are provided for determining a policy to recommend transitions in a position-representing space for a robotic device by using a multi-critic architecture. To learn the policy in a multi-critic architecture, multiple critics are defined with respective objective functions (also referred to herein as "reward functions") that balance accuracy, exploration and/or safety. For example, a policy can be learned based on weighted feedback of learned value functions associated with each critic and can be used to recommend safe transitions in the position-representing space. The multi-critic architecture can minimize interference between multiple reward functions and provide for safe and stable policy learning for a robotic device.

In some embodiments, a method for determining a policy for safe skill discovery in a position-representing space that possesses a high degree of freedom or comprises of a continuous state space. The position-representing space can include cartesian space or latent (or position) representation space. The method further includes accessing objective function of the first critic based on a reach-reward objective configured to be anti-correlated with an extent of a movement from an initial position to a target position within a position-representing space. The objective function of the second critic is accessed based on a discovery-component objective configured to be correlated with an extent to which the movement-triggers expansion of a bound or volume of the position-representing space. The objective function of the third critic is accessed based on a safety-component objective that is configured to be anticorrelated with an extent to which any of one or more safety constraints are violated during or at a completion of the movement. For each critic, a learned value function in the position-representing space is identified that is based on the objective function of the critic. The weights are assigned to each critic where the assigned weights are same in some instances of the present disclosure. After learning the value function for each critic, stored sensor data or online (e.g., live) sensor data is received for the robotic device to identify a position within the position-representing space that corresponds to the stored sensor data or online sensor data. The policy corresponds to a movement objective and is updated based on the learned value function for each critic and the assigned weight of each critic. A recommended transition within the position-representing space is generated, based on the policy, where generating the representation of the recommended transition triggers a movement of a robotic device that accords with the recommended transition.

The method may further include computing, for each of the set of critics, an advantage of the learned value function. The advantage function is computed using a generalized advantage estimation by measuring a relative value of taking a specific action in a particular state over a statistical value representative of a likelihood of each of a set of actions associated with the particular state. The method further includes performing a batch normalization of the computed advantages from each critic before combining with the weights. The policy may be updated using proximal policy optimization (PPO) that is configured to limit a change in the movement objective at each update. The policy gradient method addresses stability and reliability issues associated with training policies so that a new or updated policy does not deviate too much from an old policy.

In some embodiments, a system is provided that includes one or more data processors and a non-transitory computer readable storage medium containing instructions which, when executed on one or more data processors, cause one or more data processors to perform part or all of one or more methods disclosed herein.

In some embodiments, a computer-program product tangibly embodied in a non-transitory machine-readable storage medium, including instructions configured to cause one or more data processors to perform part or all of one or more methods or processes disclosed herein.

In other embodiments, a system is provided that includes one or more means to perform part or all of one or more methods or processes disclosed herein.

BRIEF DESCRIPTION OF THE DRAWINGS

The present disclosure is described in conjunction with the appended figures.

DETAILED DESCRIPTION

Definitions

Figure 1:
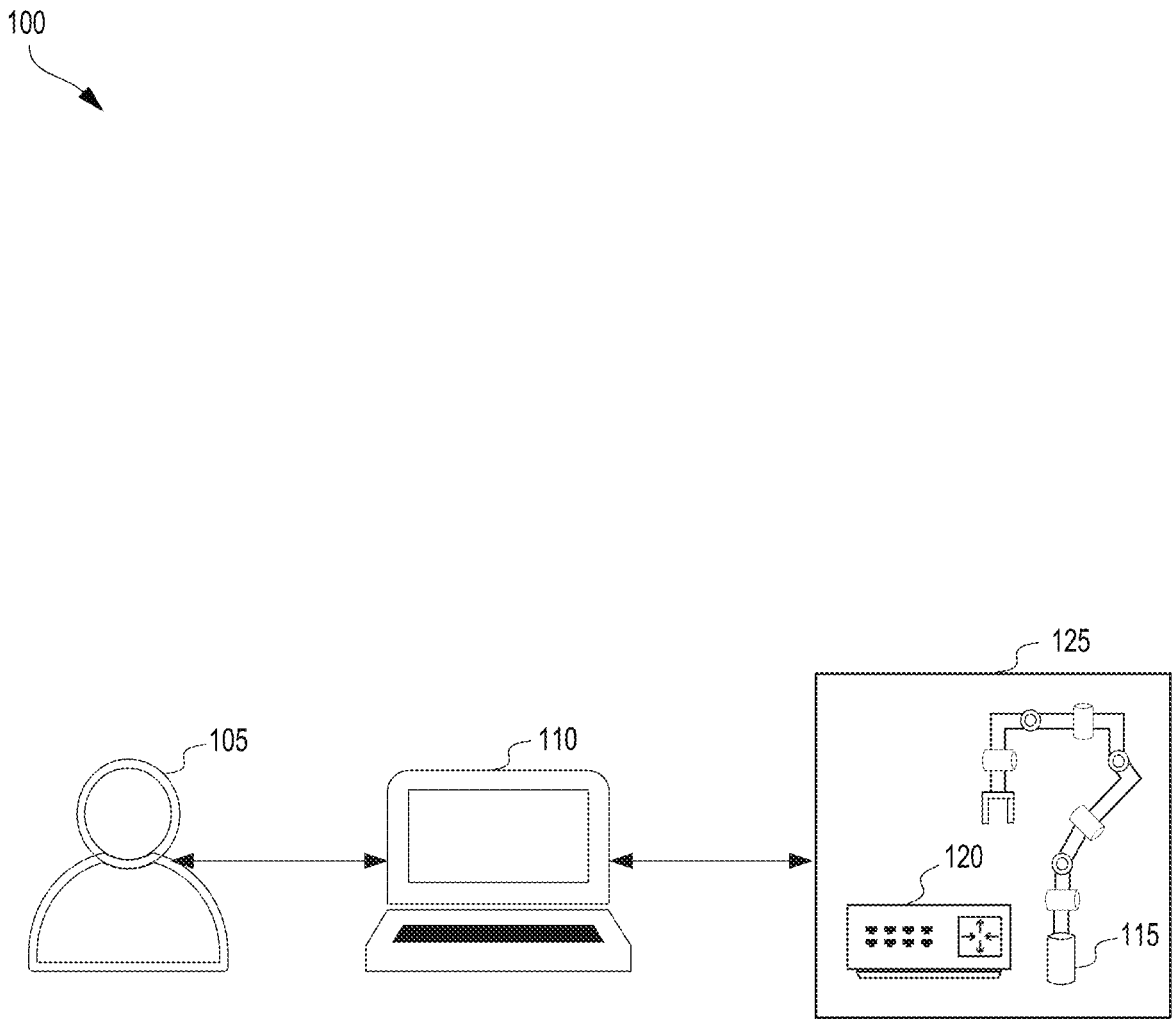
FIG. 1 is an example network for performing a method of determining actions or a sequence of actions for a robotic manipulation system in accordance with an example implementation.

As used herein, the term "state" refers to a specific configuration of at least part of a robotic device at a given moment in time. A current state and/or one or more past states can be used to inform an identification of a next action. A state may include: an orientation of the robotic device, a location of the robotic device, a velocity of the robotic device, an acceleration of the robotic device, a position of each of one or more joints in a robotic device, an angle of each of one or more joints of a robotic device, an angular velocity of each of one or more joints of a robotic device, and/or a position of each of one or more gripper of a robotic device. In some embodiments, "state" may include everything in the environment e.g. all the geometry and the spatial characteristics of the environment. A state may further or alternatively identify current or past information about an object with which the robotic device is interacting with or is to interact. For example, a state may include a pose, end-effector pose, linear velocity, angular velocity, end-effector linear velocity and/or end effector angular velocity of the object.

As used herein, the term "state space" may represent a set of all possible states or configurations of a robotic device.

As used herein, the term "action" refers to a movement that a robotic device is to perform, is performing, or has performed. The action may be represented based on (for example) a particular trajectory of part or all of the robotic device. For example, if a robotic device includes a robotic arm with a gripping mechanism at a proximal point, the particular trajectory may specify a trajectory for the gripping mechanism and/or for each of one or more components that affect a position of the gripping mechanism. The action may be represented based on (for example) a target destination. The action may be represented by one or more operation instructions for one or more hardware components of the robotic device that lead to a target action. For example, a time series that includes, for each time step: a target servo position; specified number and direction of servo clicks, or joint torque may be specified for each of one or more motors. A motor in the robotic device can be a dc motor, brushless dc motor, servo motor or stepper motor.

As used herein, the term "action space" refers to a set of all possible actions or movements of the robotic device.

As used herein, the term "skill" refers to a learned action (or learned sequence of actions) that helps in performing an assigned task by a robotic manipulation system that may include a robotic device. The learned behavior or action may nonetheless be dependent on the context. For example, if the robotic device is a robotic arm, a skill may involve learned actions such as grasping, pushing, lifting etc. A grasping skill, though the specific force applied to grip an object and/or the specific approach angle may depend on factors such as a size of the object, shape of the object, exterior texture of the object, relative location of the object, whether there are other objects near the object, etc.

As used herein, the term "environment" may refer to a real environment or a virtual environment. A tangible space of operation, referred to as a "real environment" may refer to external conditions or surroundings in which the robotic device operates. This can include physical aspects such as objects, obstacles, tools, workpieces and can also encompass more abstract elements such as lighting conditions, temperature, software constraints or network communications. The environment may be a computer-implemented simulation space, herein referred to as a "virtual environment", designed to digitally replicate or abstractly represent real-world scenarios. The virtual environment can be characterized by a set of programmatically defined states, actions, and interactions rendered through software and hardware interfaces.

As used herein, the term "transformation function" may transform an initial data point in a state space into a trajectory using a data point in the action space. The transformation function may also or alternatively indicate movements and/or motor actions that are to be performed by each of one or more hardware components of the robotic device to transition from a current position in a state space to a target position in an action space or to perform a movement indicated in an action space.

As used herein, the term "policy" may refer to a strategy or mapping from a state to an action that defines how a robotic device should act in each state to maximize its reward over time. The policy can be deterministic, where a specific state leads to a specific action or alternatively, it can be stochastic, where an action is chosen based on a probability distribution over actions. For example, for a robotic device, the policy may define what actions or a sequence of actions the robot should take in each state. In addition, as used herein, the term "skill-conditioned policy" refers to a policy specific to the skill. For example, if the robotic device is a robotic arm, a skill-conditioned policy may include, but not limited to, a policy for each skill grasping, pushing, and lifting etc. In some embodiments, a skill-conditioned policy may refer to a policy for variations of each skill, such as grasping, pushing, and lifting etc.

Overview

The present disclosure discloses embodiments relating to a multi-critic architecture for skill discovery. The multi-critic architecture uses multiple objective functions for a robotic manipulation system and demonstrates the multi-critic architecture effectiveness in the domain of the skill discovery. To learn a value function that is defined based on the multiple objective functions, a multi-critic architecture can be trained and/or can operate using a multi-task reinforcement learning (RL) problem by employing multiple critics for each objective function. The multi-critic architecture minimizes interference between the multiple objective functions and allows for stable policy learning for the robotic device.

For example, a set of critics with different objective functions (e.g., a reach-reward, discovery-reward, and/or safety-reward objective function) can use the objective functions to learn the movement successfully. In some instances, the objective functions are assessed in a manner such that a loss associated with any individual objective function is independent from one, more or all other objective functions, so as to reduce or minimize interference between the multiple reward functions. In addition, a policy can be learned based on the weighted feedback of the learned value functions of each critic to recommend a safe action in the position-representing space. The policy can be configured to identify potential transitions in a position-representing space for a task of a robotic device by using the multi-critic architecture.

The value function can be learned for each critic using the reward function of the critic in the position-representation space followed by computing an advantage function where the advantage is a measure of how good or bad an action is compared to an average of actions which could be taken in terms of expected future rewards. It will be appreciated that the reward function of each critic may be used to provide rapid (e.g., real-time) feedback for actions being taken, such that decision-making that defines actions being performed can be rapidly adjusted, if appropriate. Meanwhile, a value function can estimate an expected cumulative reward over time, which can thereby shape behavior decisions. Together, the reward and value functions can provide a foundation for reinforcement learning. An advantage function can be computed using generalized advantage estimation (GAE) by measuring a relative value of taking a specific action in a particular state over the statistical value representative of a likelihood of each of a set of actions in a particular state.

The method can further include performing a batch normalization of the computed advantages from each critic before combining with the weights. In some embodiments, other normalization techniques, such as layer normalization or instance normalization, can be used. In some embodiments, equal weights can be used to combine the normalized advantages. The stored sensor data or online sensor data can be received for the robotic device to identify a position within the position-representing space that corresponds to the stored sensor data or online sensor data. The policy can be determined based on which state transition is recommended within the position-representation space. The policy can be updated using proximal policy optimization (PPO) configured to limit a change in the movement objective at each update of a step. The PPO can be a policy gradient method that provides stability and reliability associated with the training policies. The PPO can operate by change in policy at each update step so that the new or updated policy does not deviate significantly from the old policy.

FIG. 1 is an example network for performing a method of determining actions or a sequence of actions for a robotic manipulation system in accordance with an example implementation. The example embodiment may be implemented by system 100 that facilitates communication between a user device 105 (e.g., a device operated by a user, who may also be a developer), a skill learning system 110, and a robotic manipulation system 125. The robotic manipulation system 125 may further include a robotic controller interface 120 for communication between a development environment and the robotic manipulation system 125. The skill learning system 110 may include a computing system configured to generate, train, and/or deploy a model to determine one or more actions or a sequence of actions (that may be associated with a task). Each action can include a movement, target destination, and/or operation instructions for one or more hardware components (motors, servos, stepper motors, etc.). Data identifying one or more actions or a sequence of actions can be availed to the robotic device 115, and a control system of the robotic manipulation system 125 can cause one or more hardware components of the robotic device 115 to move accordingly. In some instances, the skill learning system 110 is distinct and separate from the robotic device 115, such that the skill learning system 110 transmits the data identifying the one or more actions or a sequence of actions to the robotic device 115. In some instances, the skill learning system 110 is embedded within the robotic device 115, and the data can be availed to a control system of the robotic device 115 via a call to the control system or in response to a call from the control system.

The robotic manipulation system 125 can be configured to initialize or perform various mechanical operations. For example, the robotic device 115 can include a robotic arm that is configured to grip, pick up, and move one or more items. Such a robotic arm may be used on an assembly line. As another example, the robotic device 115 may include a vehicle or robot or a component of a vehicle or robot, where the robotic device 115 is configured to control steering, braking, and/or acceleration of the vehicle.

Figure 2:
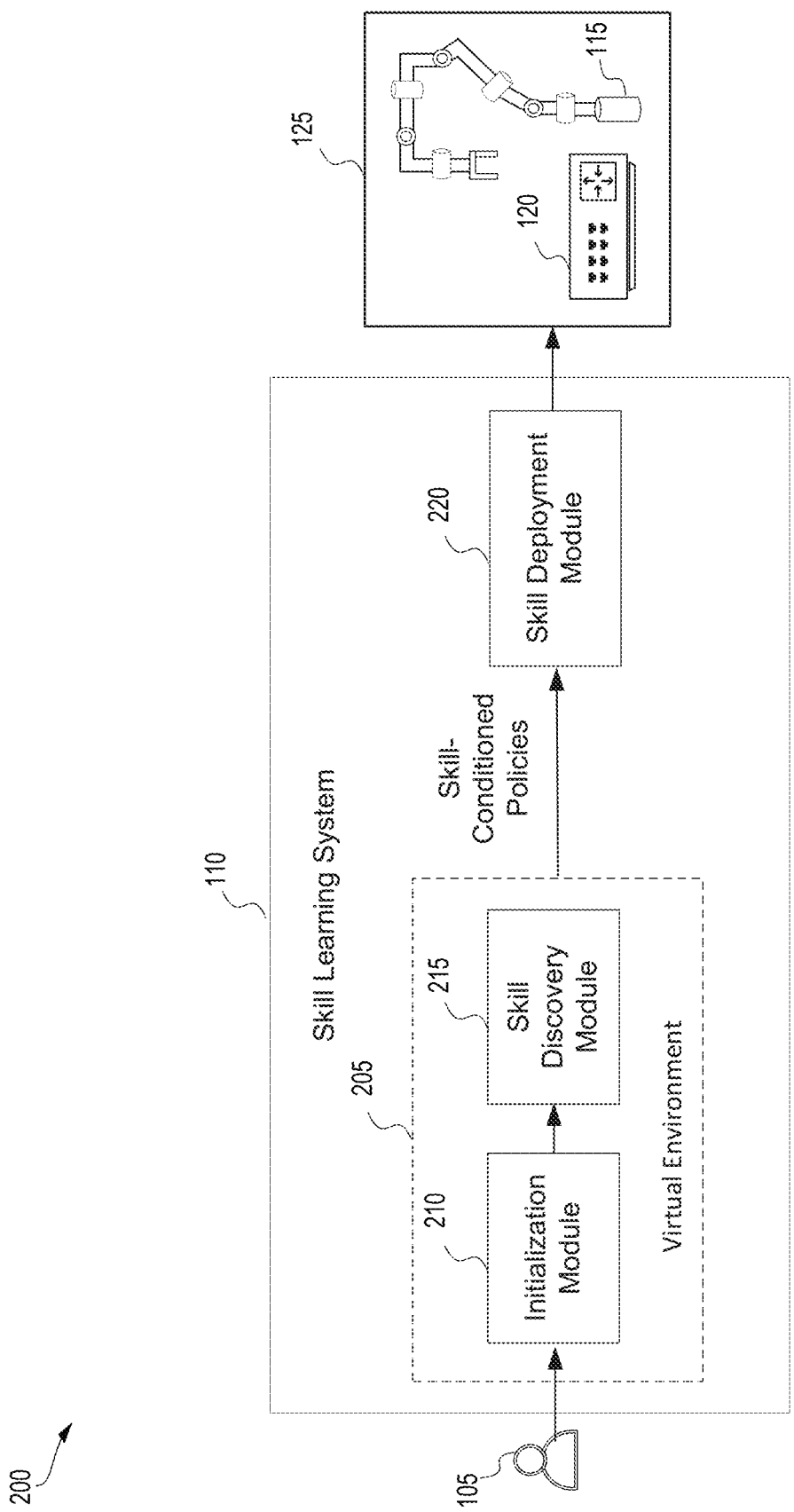
FIG. 2 is another version of the example network shown in FIG. 1, illustrating exemplary components of a skill learning system.

FIG. 2 is another version of the example network shown in FIG. 1, though the representation depicted in FIG. 2 illustrates exemplary components of the skill learning system 110. The skill learning system 110 includes a virtual environment 205 and a skill deployment module 220. The virtual environment 205 includes an initialization module 210 configured to initialize various parameters and/or spaces of a machine learning model and a skill discovery module 215 configured to explore, evaluate, and learn new skills.

The initialization module 210 can define a dimensionality of and/or axes for a state space and/or for an action space. The state space may represent a configuration of robotic device 115. For example, the state space may be configured to include an axis for each degree of freedom of the robotic device.

The initialization module 210 can configure the state space and/or the action space based on user input and/or received sensor data. For example, an interface may be configured to receive indications as to which hardware components are used to control a the movements of a robot and/or positions and to receive details about the degrees of freedoms of the hardware components. The degree(s) of freedoms and/or axes may be identified via user input that indicates each axis along which a hardware component can move and/or by analyzing sample data from a given hardware component that indicates one or more multi-dimensional data points that indicate a position and/or movement of a given hardware component at each of one or more points in time.

The virtual environment 205 can be configured to relate the state space to the action state. The virtual environment 205 can further or alternatively be configured to perform time mapping such that data points that pertain to (for example) hardware components with different movement or movement-detection frequencies are aggregated in a manner so as to identify approximate concurrent data points. For example, interpolation or curve fitting may be used to identify a data point associated with a given component at a time point where such data was not sampled. As another example, data mapping may be performed so as to map individual measured or instructed data points to one or more predefined time marks. The virtual environment 205 can further be configured to generate and/or use one or more transformations functions.

The skill discovery module 215 in a virtual environment 205 may be configured to efficiently adapt skill discovery strategies to new tasks and skills for a robotic application domain, such as locomotion, navigation, and various manipulation settings. Such adaptation may include implementing an unsupervised approach for reinforcement learning (RL). The skill discovery module 215 can simulate movements of a reinforcement-learning agent (such as a robotic device) that can be exposed to diverse scenarios and tasks. The skill discovery module 215 can simulate (within the virtual environment 205) different actions and observe the outcomes thereby receiving rewards when it performs actions that brings it closer to the desired goals, and penalties when the actions taken are counterproductive and take the agent away from the desired goals. Through trial, error, and feedback, the skill discovery module 215 discovers which actions, or a sequence of actions, are efficient and effective for achieving its goals or tasks.

The skill discovery module 215 learns to associate higher rewards with actions or skills performed in specific settings that prioritize multiple objectives (e.g., accuracy of target/object trajectory performance, skill discovery and safety) in a manner that leads to learning a policy. The multiple objectives can result in identifying various hardware movements (e.g., specific torques to joint, changing the position of the end-effector or adjusting the grip) that are to be suggested or implemented for a given environment.

The policies are learned in the skill learning system 110 using a skill discovery technique allowing the skill discovery module 215 to autonomously discover and adapt itself according to the task at hand by evaluating the proposed actions and providing its feedback in real time while it is achieving or moving towards its objective. After the skills have been discovered and refined, the skill deployment module 220 may deploy the learned policies condition on skills into a real-world environment via robotic controller interface 120 to a robotic device 115. The skill deployment module 220 may translate the learned skills into commands or actions to be provided to the robotic controller 120.

The skill deployment module 220 may also monitor performance of the deployed skill and provide feedback to the skill discovery module 220. Such monitoring may occur across value functions. For example, if a movement occurs that prioritizes a discovery value, the feedback may pertain to a degree of information that was secured via the discovery, along with one or more other variables (e.g., an extent to which an intended movement ended at a target location and/or an extent to which a movement complied with safety criteria).

The robotic controller interface 120 receives the commands or actions from the skill deployment module 220. It provides inputs to robotic device 115 and sends feedback to the skill learning system 110. For example, if the robotic device 115 fails to accomplish a given task, the system can send the failure condition in the form of an error status back to the skill learning system 110. The system 110 will subsequently update the model by recreating that failed scenario in virtual environment 205 and relearning the policies for the robotic device 115 to accomplish the task so that the failed condition can be handled in future operations. Once the model is updated, it is redeployed by the skill deployment module 220 into the real-world robotic device 115. For training, several iterations of learning, feedback and refinement may occur, and consequently, the system can gradually improve its performance on the given tasks by continuously interacting with the environment and user 105.

Figure 3:
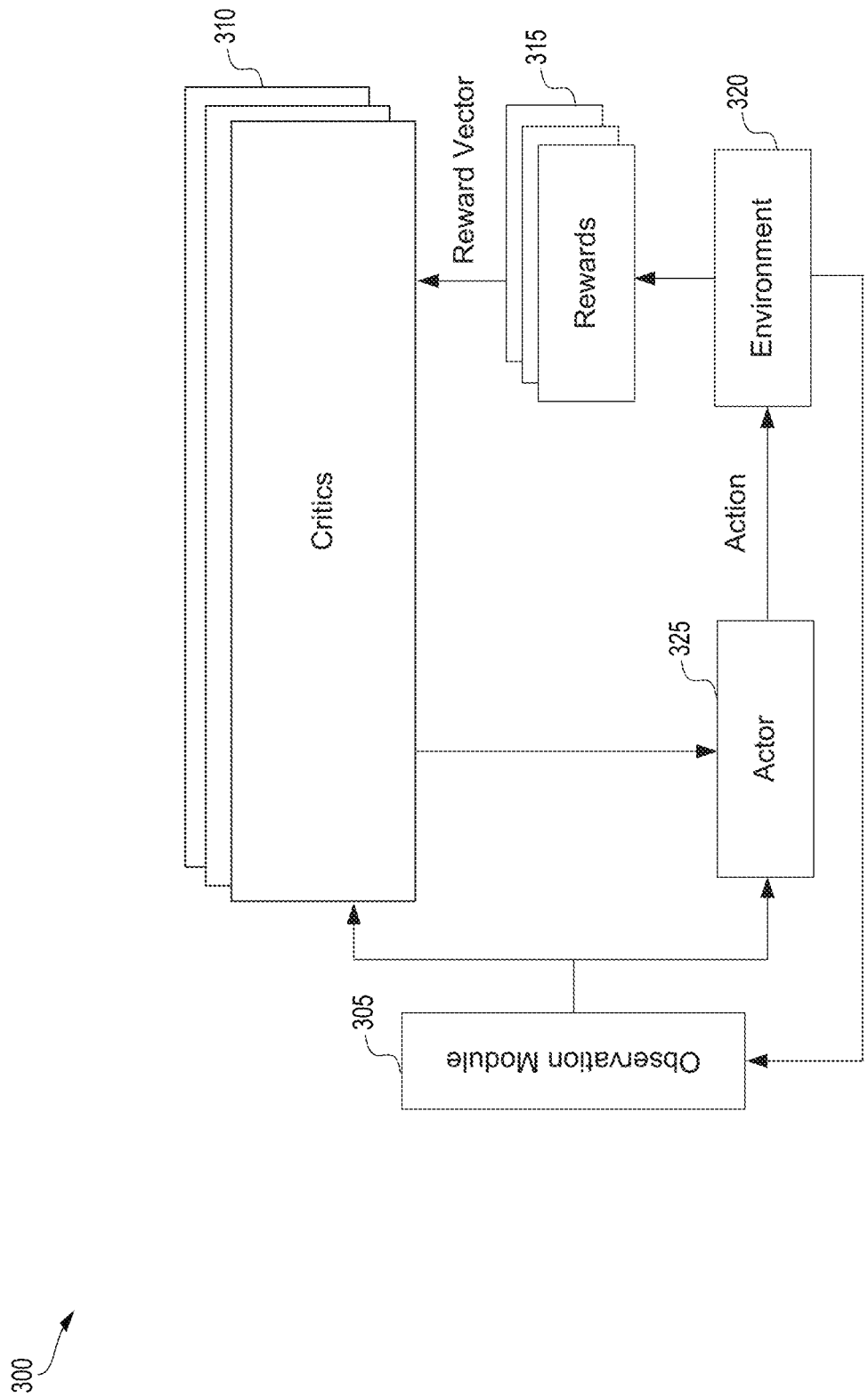
FIG. 3 illustrates components of the example environment of FIG. 1 that shows one example implementation of multiple rewards based multi-critic actor learning architecture that can enable self-supervised skill discovery in a robotic device.

FIG. 3 shows an example of a multi-critic architecture that can be used in the skill discovery module 215 of the skill learning system 110 to learn an policy. The multi-critic architecture 300 is based on one or more reinforcement-learning techniques where a reinforcement-learning agent includes an actor 325 and several critics 310. The actor can execute a "reinforcement" or any other policy-based reinforcement-learning method to learn a skill-conditioned policy. The actor performs actions in the environment 320 as defined by the policy being learned. As a result, multiple rewards 315 are generated based on the objective functions such as reach-reward, discovery-reward, and safety-reward. The next state information can be made available to both actor 325 and critics 310 through an observation module 305. For each critic of the set of critics, multiple critics 310 may be used or trained against one associated objective function in rewards 315. The critics can execute any value-based reinforcement-learning method including but not limited to: Q-learning, approximate Q-learning, or deep Q-learning. The critics may estimate the value function and map the state to the state-value (the V-value) or the action-value (the Q-value). Both actor and critics can learn together, for example, the actor 325 improves a policy gradient and learns the policy fast based on the feedback it received from the critics 310.

Figure 4:
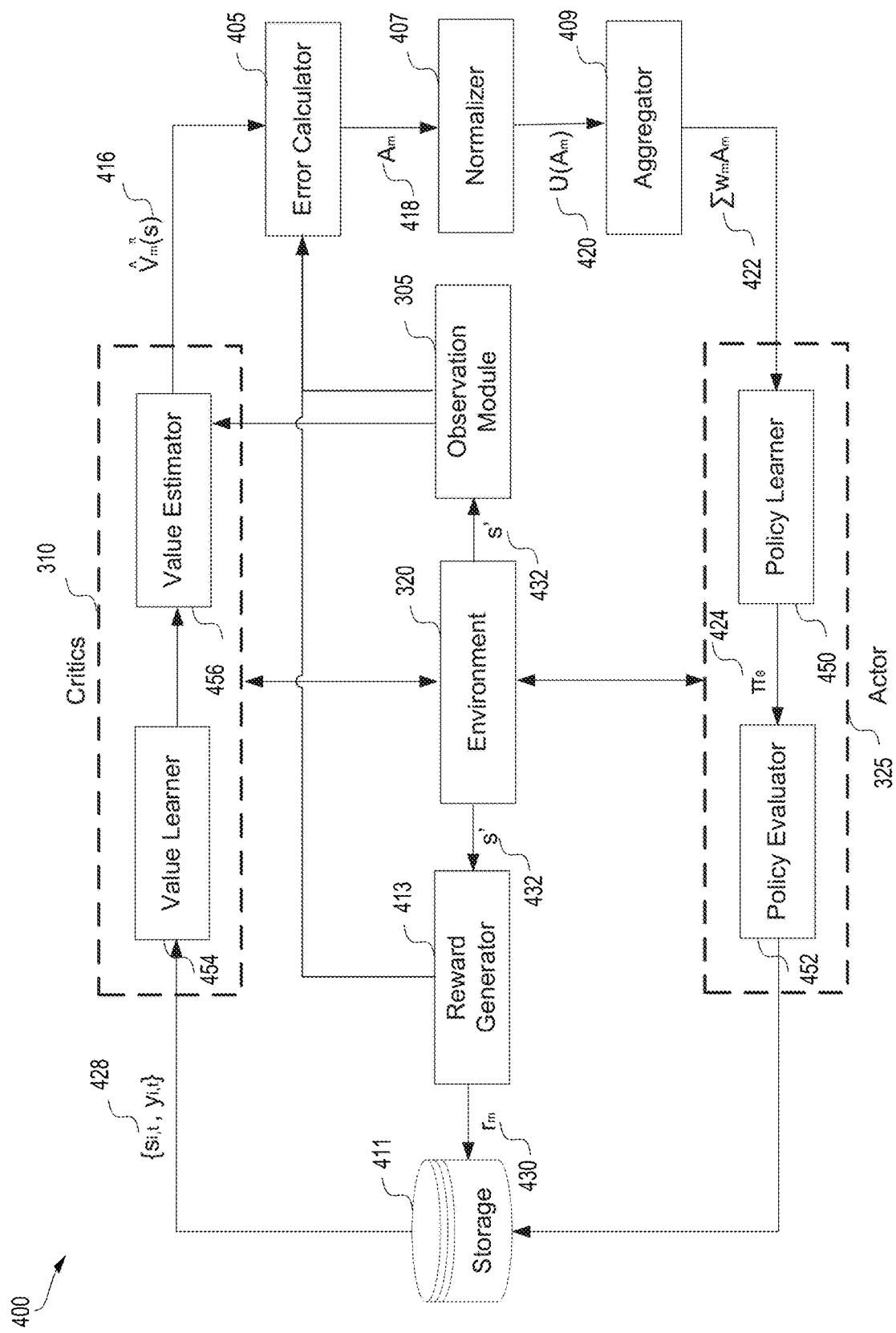
FIG. 4 shows a schematic block diagram of an example multi-critic architecture in accordance with the example implementation of FIG. 3.

FIG. 4 shows a schematic block diagram of an example multi-critic architecture 400 to learn skill-conditioned policy for the robotic manipulation system in accordance with an example implementation. The actor 325 may include a policy learner 450 and a policy evaluator 452. During the initialization phase 210, the policy learner 450 may receive an initial policy or alternatively may initialize using another policy (e.g., that uses an initiation based on a random or pseudo-random process). The policy learner 450 can learn and improve the skill-conditioned policy over time. The policy evaluator 452 may execute the current policy by taking an action at at time instant t, starting from a state s or $s_t$, in the environment 320. By taking the action, the actor can end up in the next state, s' 432 or $s_{t+1}$ in the environment 320. For each of the reward function associated with each critic m, the reward generator 413 may generate reward, $r_m$ 430, based on the actor state transition from s to s' 432. The policy evaluator 452 may iteratively execute the policy $\pi_\theta$ 424 and collect the data about the trajectories followed by a robotic device. The trajectories data comprises of the rewards and the state transition. The trajectories data can be saved in storage 411 and can be used as the training data 428 to train a value function for each critic of the set of critics 310.

In multi-critic architecture, for each of the reward functions, a value function for the critic may be learned. Each critic may comprise of a value learner 454 and a value estimator 456. The value learner 454 uses the training data namely $\{s_{i,t}, y_{i,t}\}$ 428 of the trajectories from the storage 411 to improve the value function. The value estimator 456 may use the value functions and generate the value estimates $V_m^\pi(s_t)$ 416 based on the state information. The value estimator 456 may receive the state information from an observation module 305.

The policy learner 450 can improve the policy in every iteration using the feedback of the critics 310 that is provided in terms of a value estimate 416. The baseline value may be subtracted from the sum of rewards along the trajectory in policy gradients to control the high variance. The baseline value can be an average reward, i.e., average the rewards over all possible actions in a state; alternatively, average the Q values of that state as shown in Equation 1.

$$V^\pi(s_t) = E_{a_t \sim \pi_\theta(a_t | s_t)}[Q^\pi(s_t, a_t)] \qquad \text{Equation 1}$$

The Q-value $Q^\pi(s_t, a_t)$ in Equation 2a represents the total reward once the action at is taken in state $s_t$. The Q-value can also be expressed in terms of the current reward and the sum of expected rewards from the next state $s_{t+1}$ along the trajectory i.e., $V^\pi(s_{t+1})$ as in Equation 2b. The subtraction of the baseline value $V^\pi(s_t)$ from the Q-value, $Q^\pi(s_t, a_t)$, is called an advantage as defined in Equation 3. The advantage describes how much (relatively speaking) better is the action $a_t$ in the state $s_t$ compared with the average of actions which could be taken in the state $s_t$. The value of the average of actions which could be taken is given by $V^\pi(s_t)$. The error calculator 405 may calculate advantages $A_m$ 418 by subtracting the estimated value $V^\pi(s_t)$ 416 from the observed Q-value $Q^\pi(s_t, a_t)$. The normalizer 407 may apply batch normalization on $A_m$ 418 with a normalization function v. After that, a weighted sum of normalized advantages $(U(A_m)$ 420) namely $\Sigma \omega_m A_m$ 422 may be generated by an aggregator 415.

$$Q^\pi(s_t, a_t) = \sum_{t'=t}^{T} E_{\pi_\theta}[r(s_{t'}, a_{t'} | s_t, a_t)] \qquad \text{Equation 2a}$$

$$Q^\pi(s_t, a_t) \approx r(s_t, a_t) + V^\pi(s_{t+1}) \qquad \text{Equation 2b}$$

$$A^\pi(s_t, a_t) = Q^\pi(s_t, a_t) - V^\pi(s_t) \qquad \text{Equation 3}$$

The policy gradient expression of the actor 325 in multi-critic architecture is shown in Equation 4. The value functions associated with each critic or reward function may be used to improve the high variance in a policy gradient. In Equation 4, N represents the number of trajectories that are sampled during the policy evaluation step. Even if the sampling were to restart from the same point, it could reach a different next state because the process is stochastic in nature. Therefore, the policy evaluator 452 may collect the trajectories data of multiple trajectories (i.e., N). Policy learner 450 may use the Equation 5 to update the skill-conditioned policy parameters θ. Both actor 325 and critics 310 continuously learn together until the convergence is achieved i.e., the policy stops improving or predicting the consistent/same action in consecutive iterations for each of the states.

$$\nabla_\theta J(\theta) \approx \frac{1}{N} \sum_{i=1}^{N} \sum_{t=1}^{T} \nabla \log \pi_\theta(a_{i,t} | s_{i,t}) \sum_m \omega_m A_m^\pi(s_{i,t}, a_{i,t}) \qquad \text{Equation 4}$$

$$\theta \leftarrow \theta + \alpha \nabla_\theta J(\theta) \qquad \text{Equation 5}$$

where alpha (α) represents the learning rate.

In one instance, a Monte-Carlo method can be used to sample trajectories by policy evaluator 452. The training data set comprises of states and sum of rewards along the trajectory. In another instance, a bootstrap method can be used to generate training data by policy evaluator 452. The training data set then comprises of states and sum of instantaneous rewards with the value estimate of the next state, herein the next state is generated using a fitted value function in the previous iteration.

In one of the embodiments, model-based reinforcement-learning methods may be used to discover the safe skill using multiple reward functions. The state transition probabilities and other missing parameters (if any) may be learned from a large sample of a training dataset. After that, the underlying Markov Decision Process (MDP) can be solved by using but not limiting to only value iteration algorithm, or policy iteration algorithm.

According to an aspect of the present disclosure, many different configurations can be used in the multi-critic architecture to enable fast convergence that include but not limit to: Deep Deterministic Policy Gradients (DDPG), Twin Delayed Deep Deterministic Policy Gradients (TD3), Proximal Policy Optimization (PPO), Soft Actor Critic (SAC), Asynchronous Advantage Actor Critic (A3C), Advantage Actor Critic (A2C) etc.

In one embodiment, the policy learner 450 (in actor) and value learner 454 (in critics) may train separate independent neural networks. In another embodiment, the actor 325 and critics 310 may use a joint shared neural network that has multiple outputs such as action and values of the state against each of the reward function or critic.

According to an aspect of the present disclosure, a computer-implemented method including identification of a set of critics that pertain to a position-representing space where each critic corresponds to a different objective function is provided. The method includes a composite reward function $\mathcal{R}$ comprising three objective functions associated with each critic to enable discovery of meaningful and safe interaction skills. The composite reward function comprising reach-reward ($r_{reach}$) as defined in Equation 6 associated with the first critic, discovery-reward ($r_{discovery}$) as defined in Equation 8 associated with the second critic, and safety-reward ($r_{safety}$) as defined in Equation 9 associated with the third critic.

To implement an example embodiment of the present disclosure, a latent-space augmented Markov decision process in the domain of robotic manipulation $\mathcal{M} = (\mathcal{S}, \mathcal{A}, \mathcal{P}, \mathcal{Z})$ can be used where $\mathcal{S}$ is the state space with state vectors ($s \in \mathbb{R}^{42}$) in a position-representing space such as cartesian space including positions and orientations of the robotic device and the object with which the robotic device is interacting with or is to interact. $\mathcal{A}$ is the action space of actions ($a \in \mathbb{R}^7$), split into two parts: (1) $a_{arm} \in [-1,1]^6$ corresponding to delta pose of the end-effector of the robotic manipulation system in the cartesian space, which can be converted to joint torques using operational space control (OSC); and (2) $a_{gripper} \in [-1,1]^6$, a Boolean action to open or close the gripper. $\mathcal{P}$ is the transformation function that may refer to a mapping of a state-action pair to a new state. A transformation function may define how an environment changes in response to actions taken by a robotic device. The transformation function may take a current state and an action executed by the robotic device and yields a subsequent state representing the updated state of the robotic device.

TABLE 1

Skill Learning with Multiple Critics (SLIM) Method
Skill Learning with Multiple Critics (SLIM)

Require: Reward functions, Critics $V_m$, Policy $\pi_\theta$,
state representation space $\phi$, normalization
function $\upsilon$
repeat
1:     Sample sequence of skills $(z_1, z_2)_n$ for rollouts
2:     Collect trajectories using $\pi_\theta$ and $(z_1, z_2)_n$
3:     Update $\phi$ with rollout data to maximize equation (7a)
4:     for m $\in$ {reach, discovery, safety} do
5:         Update $V_m$ ; $\min_{\forall(s^t,z^t)\in\tau} \|V_m(s^t, z^t) - \Sigma_{j=t}^{j=T} r_j^j\|$
6:         Compute advantage with GAE
7:     end for
8:     for m {reach, discovery, safety} do
9:         Batch normalize advantages $A_m$: $A_m \leftarrow \upsilon(A_m)$
10:    end for
11:    Update policy $\pi_\theta$ with PPO of Equation 3
until convergence In accordance with the computer-implemented method given in TABLE 1, an aspect of the embodiment may provide a method for determining an action of a robotic device that includes learning a distribution of multiple rewards according to an action of a robot or robotic device or system and/or implementing an action based on the same. The reward functions can be defined for a set of multiple critics in a position-representing space where each critic corresponds to a different objective function.

An exemplary critic is configured to use a reach-reward objective function that is anti-correlated with an extent of a movement from an initial to a target position within a position-representing space. The reach-reward objective function can be defined as:

$$r_{reach} = \frac{1}{\|ee\_pos_t - target\_pos_t\|_2^2 + \epsilon} \quad \text{Equation 6}$$

where $ee\_pos_t$ is an initial position that may refer to the position of an end-effector of a robotic manipulation and $target\_pos_t$ is a target position, for example, a position of an object, and $\epsilon$ is a threshold for numerical stability.

Another exemplary critic is configured to use a discovery-component objective function that is correlated with an extent to which the movement triggers expansion of a bound or volume of the position-representing space. The objective function of the discovery-component or discovery-reward ($r_{discovery}$) as can be derived from Lispchitz-constrained unsupervised skill discovery (LSD) as defined in Equation 7a and Equation 7b. The mutual information between a skill, encoded by a latent variable z sampled from a fixed distribution, and states s visited by a policy conditioned on this skill is maximized (where the policy avoids a given set of unsafe states, which take a latent variable z as input that controls the type of behavior). To improve mutual information-based skill discovery for learning dynamic skills, Lispchitz-constrained unsupervised skill discovery (LSD) may be used that proposes the maximization of the objective $J_{LSD}$ as shown in Equation 7a and Equation 7b:

$$J_{LSD} = E_{r,z} [\phi(s_T) - \phi(s_0)]^T z \quad \text{Equation 7a}$$

$$\text{s.t.} \|\phi(s_T) - \phi(s_0)\| \leq \|s_T - s_0\| \quad \text{Equation 7b}$$

This objective effectively encourages maximal displacement in a learned state representation space $\phi(s)$, constrained by actual state space displacement with a 1-Lipschitz constant, while providing diversity by aligning displacement in representation space with latent skill vectors. State representation space $\phi$ and policy $\pi$ are jointly learned using stochastic gradient descent and reinforcement learning. The objective $J_{LSD}$ from Equation 7a can be decomposed using a telescoping sum $E_{r,z} [\Sigma_{t=0}^{t=T-1} (\phi(s_{t+1}) - \phi(s_t))^T]^T z$ to derive per-transition rewards for a policy conditioned on skill $\pi$(a|s, z), and the Lipschitz constraint can be implemented using the spectral normalization as shown in Equation 8.

$$r_{discovery} = (\phi(s_{t+1}) - \phi(s_t))^T z_t \quad \text{Equation 8}$$

Another exemplary critic uses an objective function that is based on a safety-component objective that is configured to be anticorrelated with an extent to which any of one or more safety constraints are violated during or at a completion of the movement.

$$r_{safety} = -\mathcal{J}(s_t) \quad \text{Equation 9}$$

where $\mathcal{J}$ is a safety indicator function over the states encoding predefined safety constraints which are agent and environment dependent. In the context of robotic manipulation, such constraints may involve position of one or more joints, velocity of one or more joints, self-collision avoidance, velocity of end-effector, and workspace limits.

Figure 5:
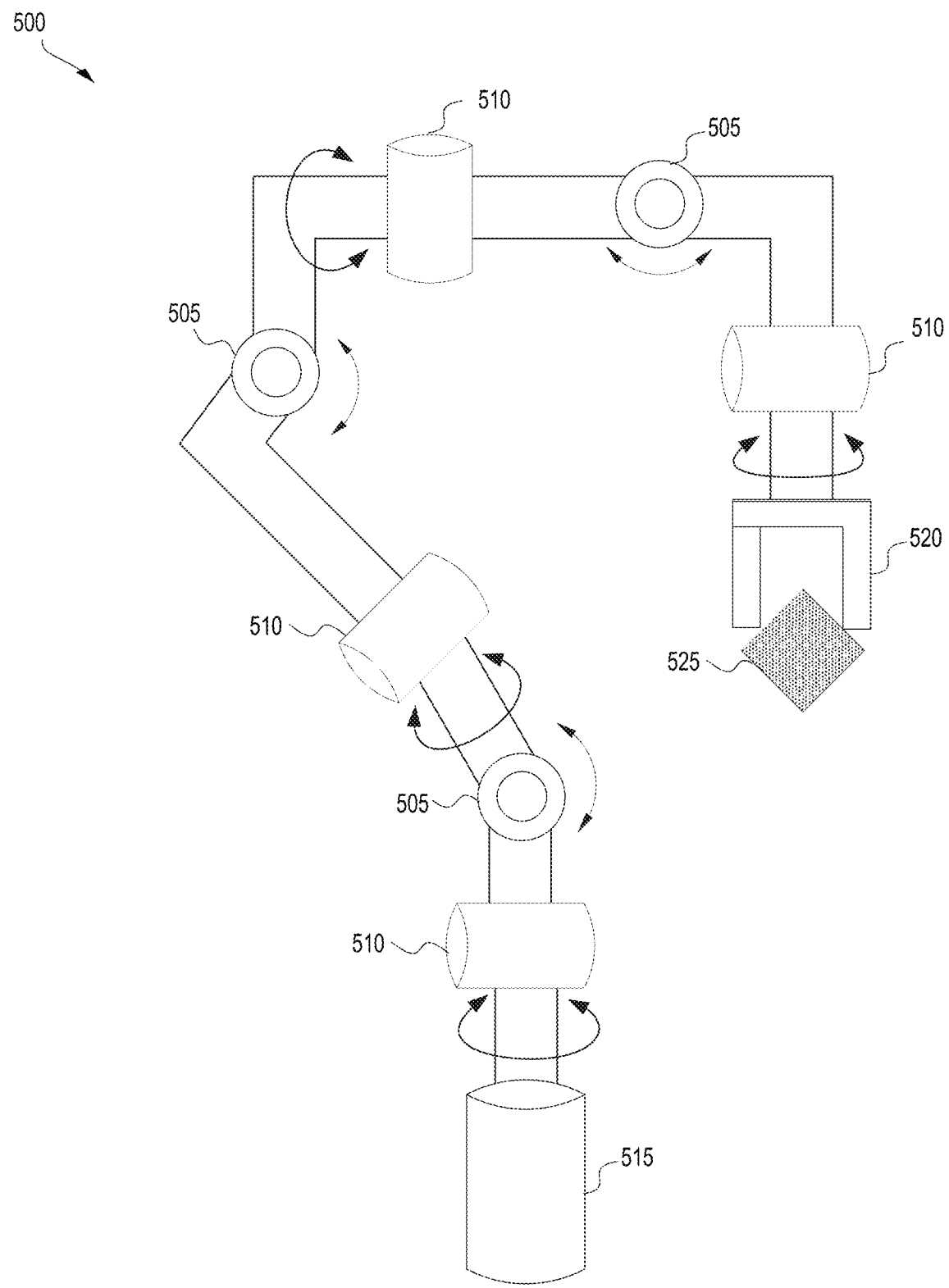
FIG. 5 shows an example robotic device used in the example network of FIG. 1 in accordance with an example implementation.

FIG. 5 is a robotic arm example of a robotic device 115 having multiple degrees of freedom for traversing a gripping end effector along one or more trajectories to position the gripping end effector at a desired destination location. The robotic arm 500 can include multiple vertical joints 505 and horizontal joints 510 configured to rotate along one or more axes, multiple links to support and connect joints, an end-effector 520 that grips an object 525 and a base 515 that hosts the entire robotic device from the resting surface(s). Each type of joint like 505 and 510 are configured to rotate within a range of angles to enable movement in different directions and orientations. The joints 505 and 510 are equipped with actuators such as motors and sensors allowing precise control and feedback on the values of respective positions, speed, and torque. The links in between the joints 505 and 510 are strong and rigid and are designed to bear the weight of the robot and any additional object 525. The end-effector 520 further includes a pair of opposed grippers to its end for picking up and dropping off an object 525 to its reachable space. Objects may include but are not limited to: a cube, spatula, a stapler, a pencil and the like. In other implementations, more objects, fewer objects, additional objects, and/or alternative objects may be provided during all or portions of gripping attempts of robotic arm 500 as described herein.

Figure 6:
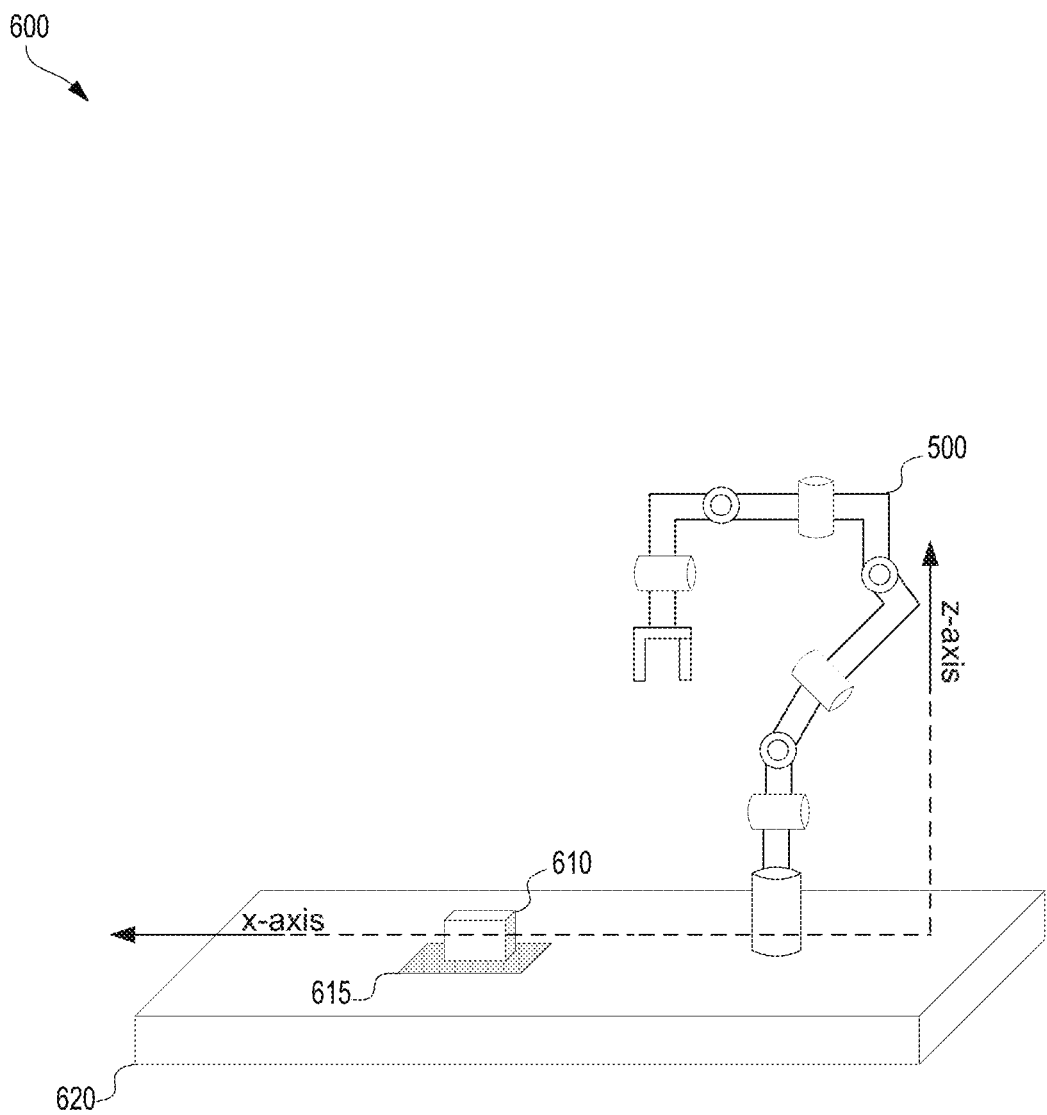
FIG. 6 is an example implementation of a tabletop robotic manipulation system in a virtual environment for a self-supervised safe skill discovery.

In an example implementation, a tabletop robotic device modeled in a virtual environment is illustrated in FIG. 6. The example environment includes a robotic arm 500, a resting surface 620, and an object 610. To illustrate the example, a cube 610 may be considered as an object 610. Other instances of objects may include, but are not limited to, a spatula, a stapler, a pencil and the like. Although, the resting surface 620 for the cube object 610 is illustrated as a tabletop in FIG. 6, it may also include any other surface such as a tray, workbench, conveyor belts, shelves, racks, ground, or floor surface, and/or other surface(s) depending on an application domain. The robotic arm 500 is mounted on table 620 and is initialized in a fixed configuration as shown in a side view image in FIG. 6. Meanwhile, object 610 is initialized at a randomly sampled position within an initialization area, as illustrated with a square 615 in FIG. 6. The orientation of object 610 is also initialized randomly from a wide distribution such as a uniform distribution over axis angle rotations.

Figure 7A:
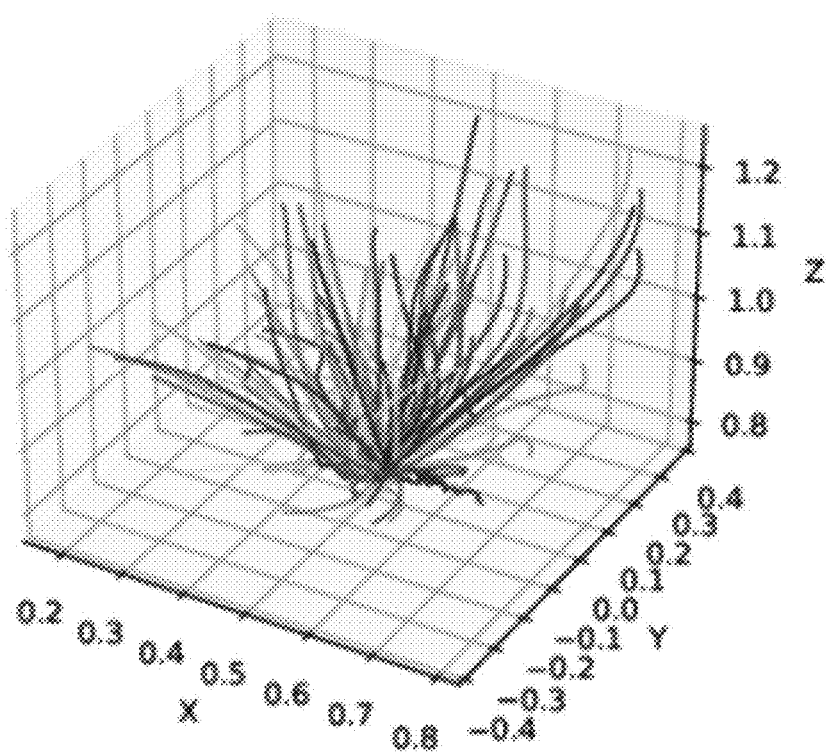
FIG. 7A is an example illustration of object trajectories over several environment steps with skill-conditioned policies for a number of randomly sampled skill vectors, for the baseline SLIM embodiment in the example virtual environment of FIG. 6.
Figure 7B:
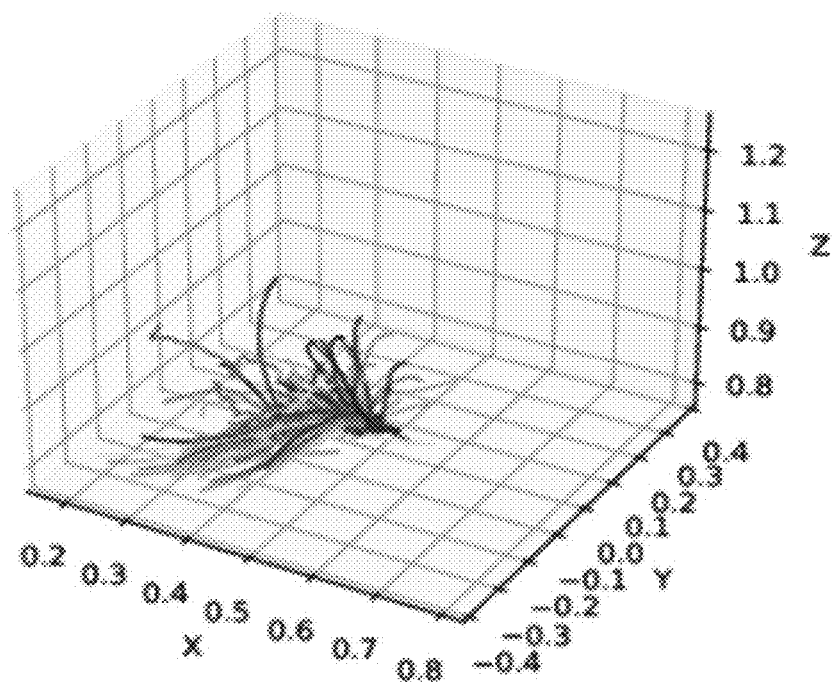
FIG. 7B is an example illustration of object trajectories over several environment steps with skill-conditioned policies for a number of randomly sampled skill vectors, for a variation of SLIM with unnormalized reward function in the example virtual environment of FIG. 6.
Figure 7C:
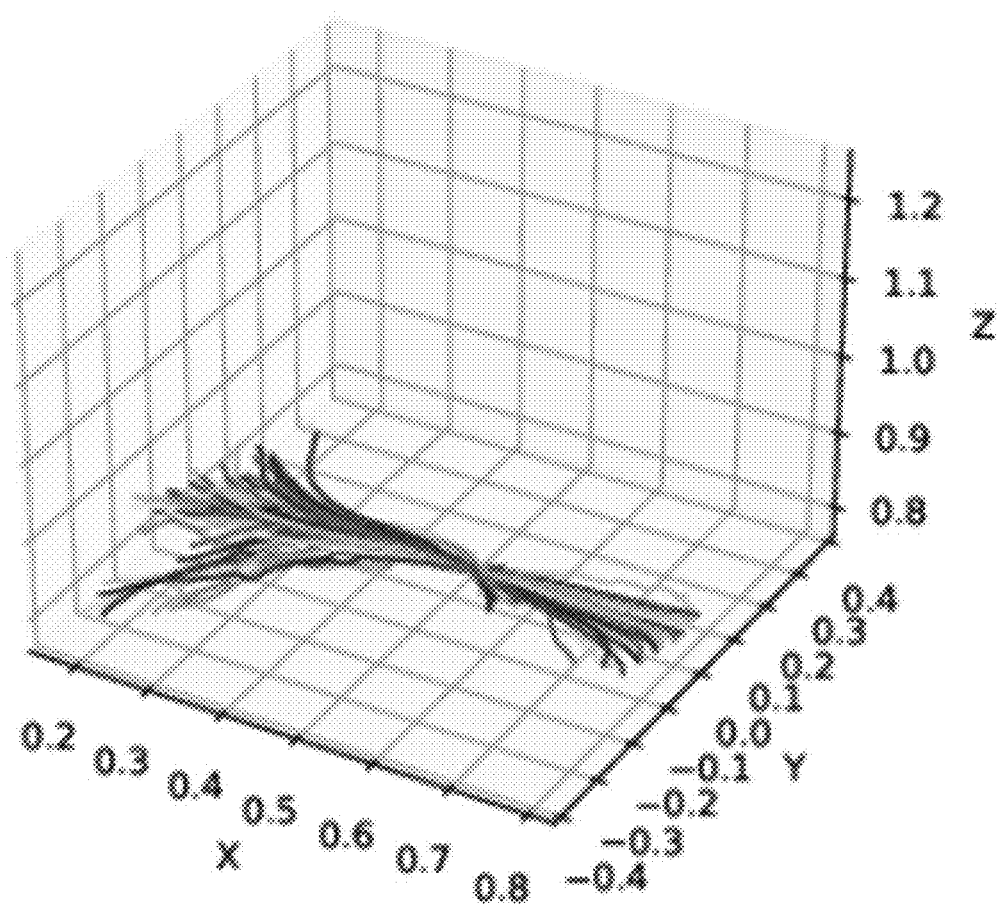
FIG. 7C is an example illustration of object trajectories over several environment steps with skill-conditioned policies for a number of randomly sampled skill vectors, for a variation of SLIM with normalized reward function in the example virtual environment of FIG. 6.

Using the example implementation described herein, various example embodiments of the proposed skill discovery technique can be analyzed in the virtual environment 600 of FIG. 6. The example implementation focuses on the significance of three reward components from Equations 6, 8 and 9 to develop a suitable skill-conditioned policy, which can meet different constraints, for different robotic manipulation scenarios. These variations are combined into two groups of a baseline skill discovery method. The first group uses the same three reward functions as the baseline SLIM method but combined into a single reward function and hence is using a single critic. The second group considers a subset of combinations of the three reward functions by including any of the two rewards functions and excluding the third one. FIG. 7A is an example illustration of object trajectories over several environment steps with the skill-conditioned policies for a number of randomly sampled skill vectors. The object trajectories for the baseline SLIM method, as described in TABLE 1, is illustrated in FIG. 7A. The variation of the baseline SLIM method namely SLIM unnormalized rewards (SLIM_ur) is shown in FIG. 7B. This variation uses the weighted sum of all three rewards into a single reward function and hence can be considered as using a single critic. This provides the same reward signals that are used in the baseline SLIM method except that the weighted combination of the rewards is performed before learning a single critic. In FIG. 7B, the skill policy rollouts with this variation in the baseline SLIM embodiment and it shows that some grasping and lifting behavior is learned but the trajectories are less diverse in nature than the baseline SLIM embodiment of FIG. 7A, which uses multiple critics. Furthermore, to prevent differences in reward scales that may affect the performance, a second variation embodiment namely SLIM normalized reward (SLIM_nr) in FIG. 7C is defined where all rewards are normalized to a unified scale. Like SLIM, normalization is applied to the advantages that are computed from each critic before performing a weighted combination for actor learning in SLIM_nr to ensure that the values of all reward signals are mapped to a normalized scale. The trajectories from this variation are visualized in FIG. 7C that not only shows less diversity than the trajectories of the baseline SLIM in FIG. 7A but also fails to learn grasping and picking of an object objective.

Figure 7D:
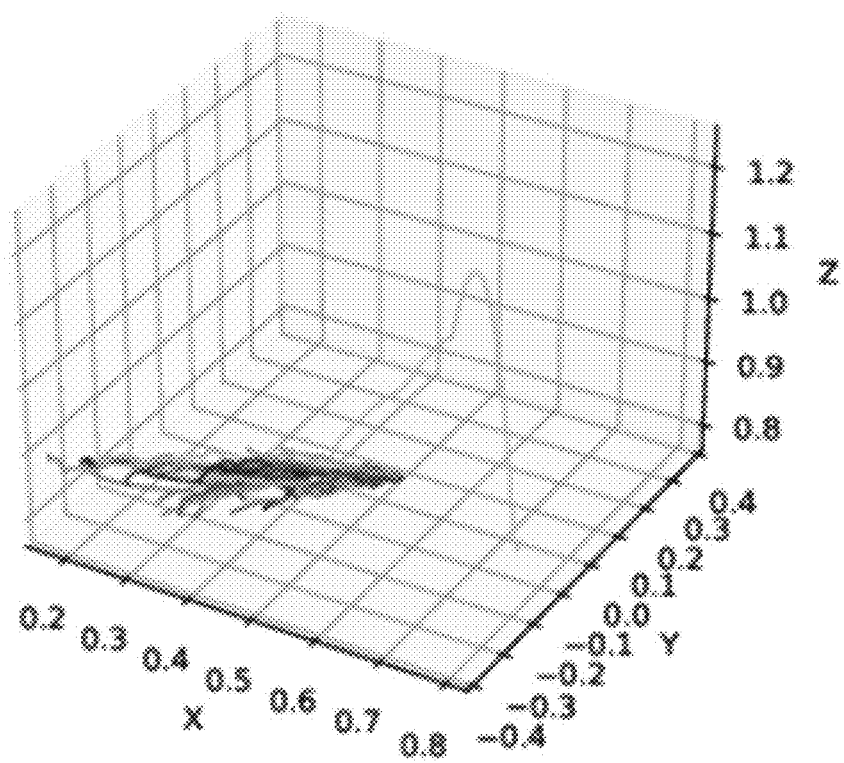
FIG. 7D is an example illustration of object trajectories over several environment steps with skill-conditioned policies for a number of randomly sampled skill vectors, for a variation of SLIM with no reach-reward function in the example virtual environment of FIG. 6.
Figure 7E:
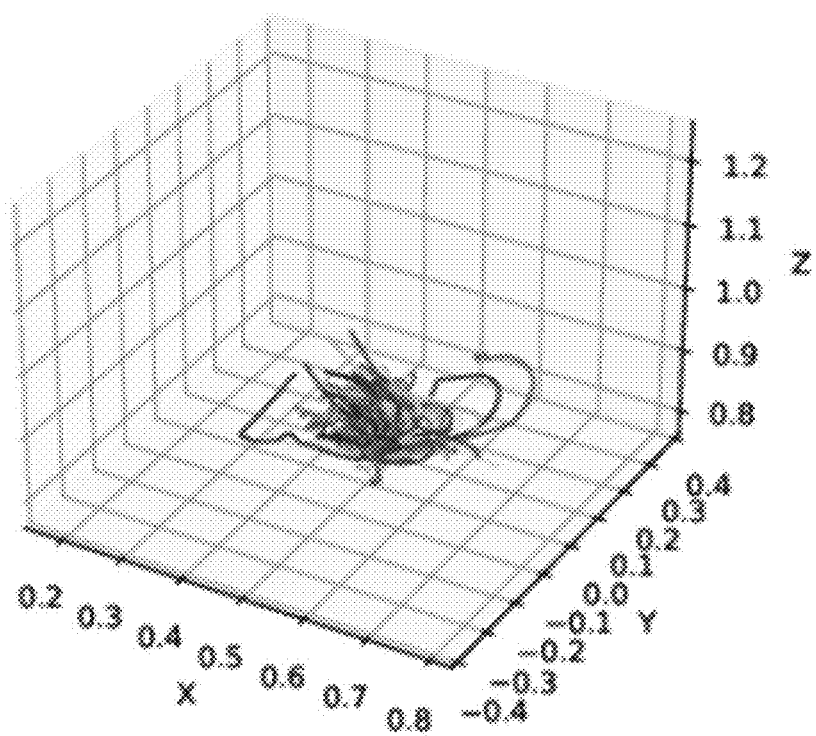
FIG. 7E is an example illustration of object trajectories over several environment steps with skill-conditioned policies for a number of randomly sampled skill vectors, for a variation of SLIM with no discovery reward function in the example virtual environment of FIG. 6.
Figure 7F:
FIG. 7F is an example illustration of object trajectories over several environment steps with skill-conditioned policies for a number of randomly sampled skill vectors, for a variation of SLIM with no safety rewards in the example virtual environment of FIG. 6.
Figure 7F:
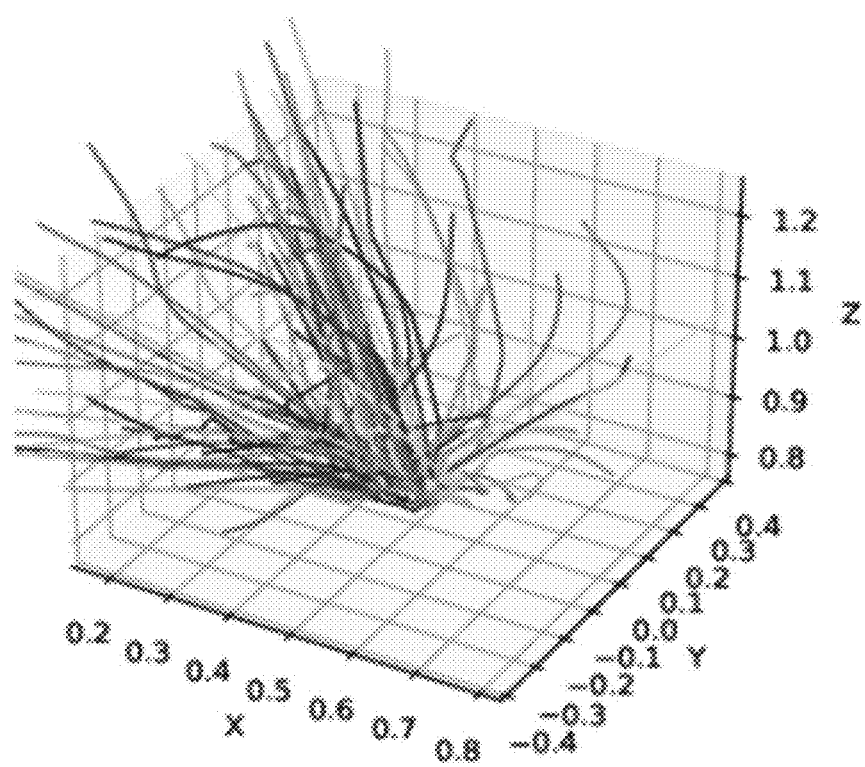

The second group that considers a subset combinations of the reward functions include but are not limited to: (1) SLIM no reach (SLIM_no_r) using $r_{discovery}$ and $r_{safety}$; (2) SLIM no discovery (SLIM_no_d) using $r_{reach}$ and $r_{safety}$; and (3) SLIM no safety (SLIM_no_s) using $r_{reach}$ and $r_{discovery}$. In FIG. 7D, the trajectories of SLIM_no_r suggest that the safety reward constrains in LSD does not allow knocking objects off the table but can displace objects in a limited space only. On the other hand, SLIM_no_d in FIG. 7E shows safe object manipulations with some grasping, pushing, and lifting, but has only limited diversity as the discovery reward component is missing. Finally, for SLIM_no_s in FIG. 7F, the robot learns to displace the object in multiple directions showing a remarkably effective combination of reaching and distance maximization discovery rewards that are similar to the baseline SLIM but is has no safety objectives; consequently, it can learn to over-extend the robot to maximize the discovery component that may lead to configuring the robotic device in an unsafe mode.

Figure 8A:
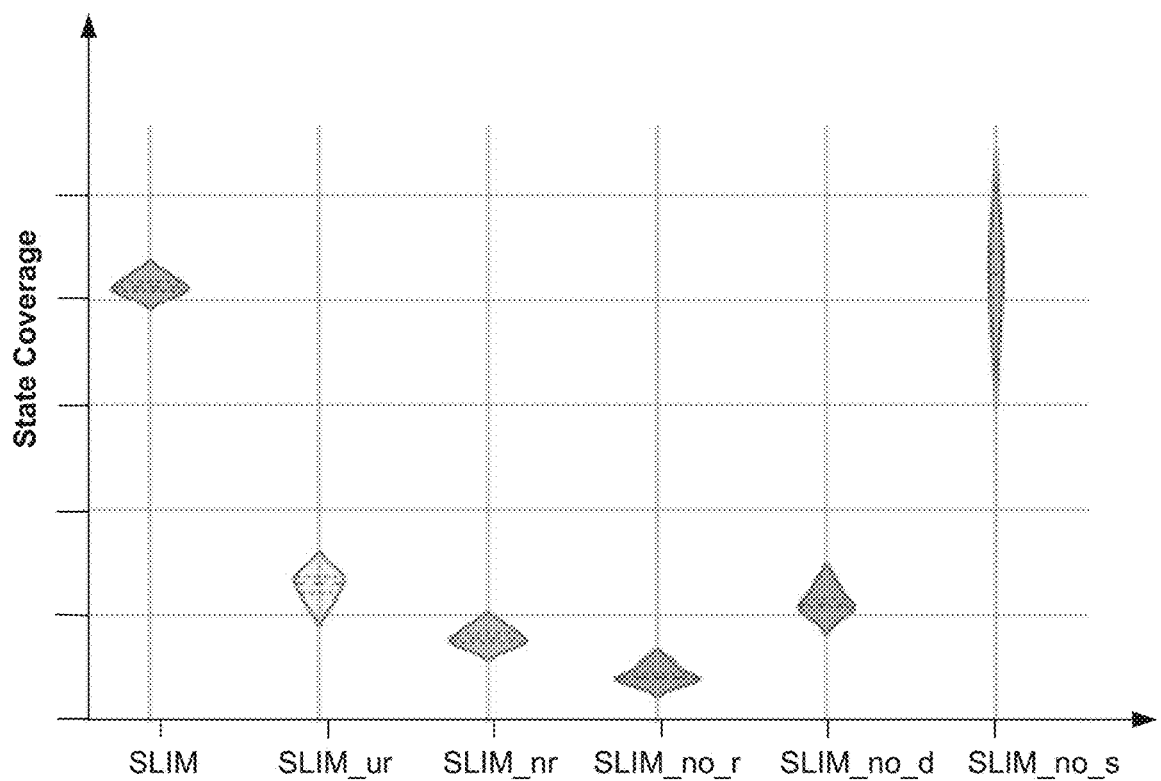
FIGS. 8A and 8B shows a violin plot illustrating coverage and safety performance of a self-supervised skill discovery robotic manipulation strategies along with their variations in the example virtual environment of FIG. 6.

In FIG. 8A, an exemplary effectiveness of the disclosed method along with its different variations of an embodiment is illustrated via a drawing a violin plot for comparing and analyzing distributions of safety and coverage, in accordance with the example implementation of FIG. 6. A violin plot is a method of plotting numerical data of one or more variables using density curves by showing a rotated kernel density plot of variables on each side such as safety and coverage measures for a specific variation of an embodiment. The violin plot shows the probability density of the data at different values that helps the actor to visualize the distribution of the data and its probability density. Coverage is the number of boxes that covers the discretized workspace by an object, and safety is the ratio of safe states encountered during several random skill rollouts.

Figure 8B:
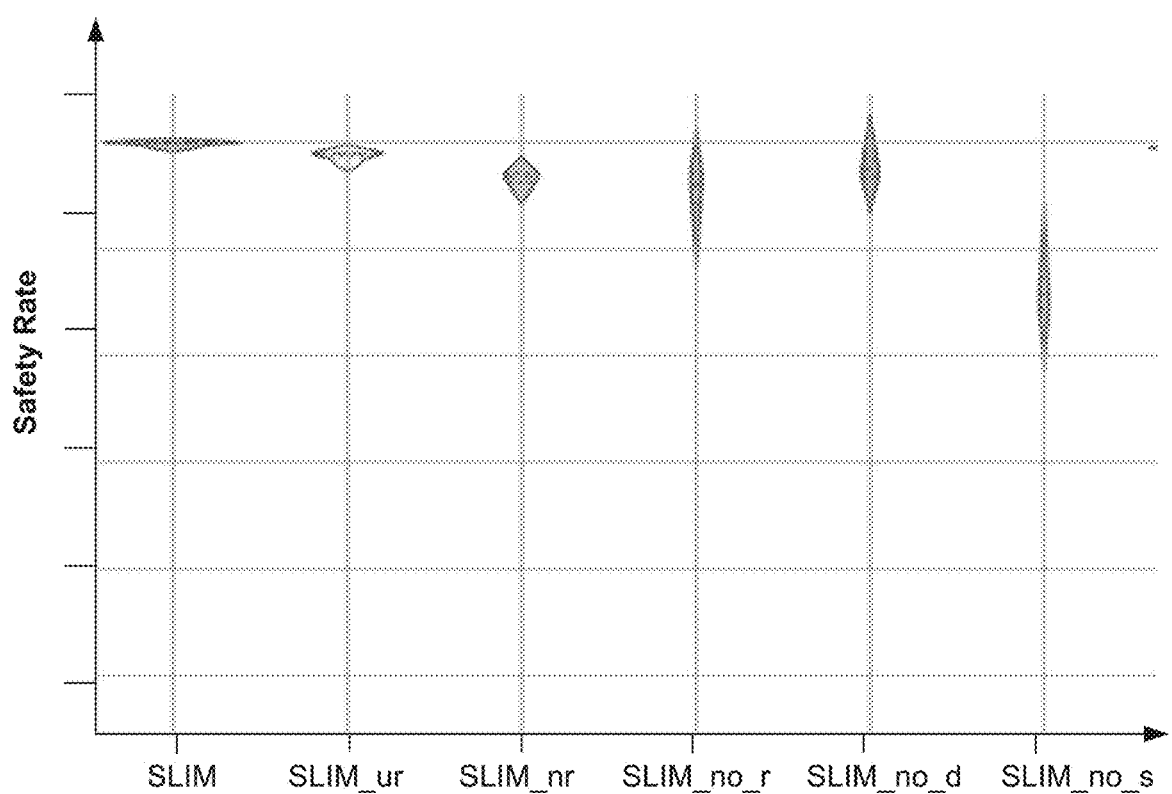
Figure 9A:
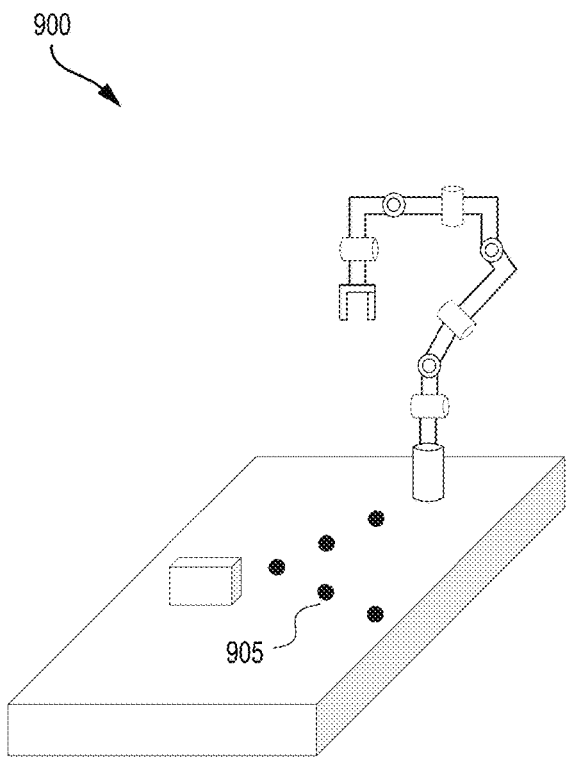
FIGS. 9A, 9B, 9C and 9D illustrates a safe trajectory following of a robotic manipulation strategy in the example virtual environment of FIG. 6 for hierarchical reinforcement learning (HRL) policies learned over the baseline SLIM as primitive motor skills.
Figure 9B:
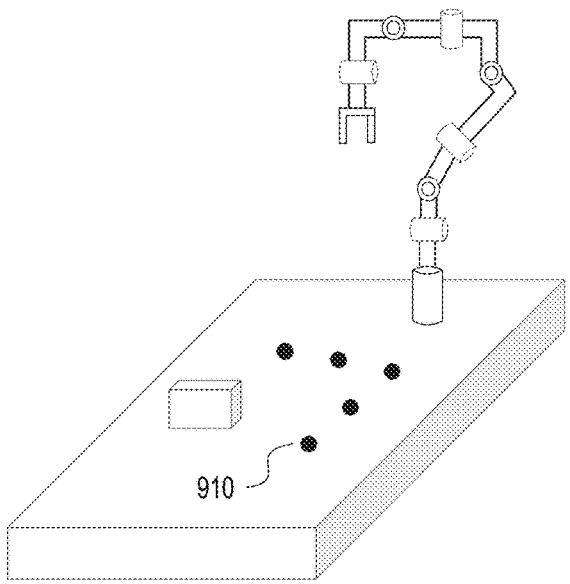
Figure 9C:
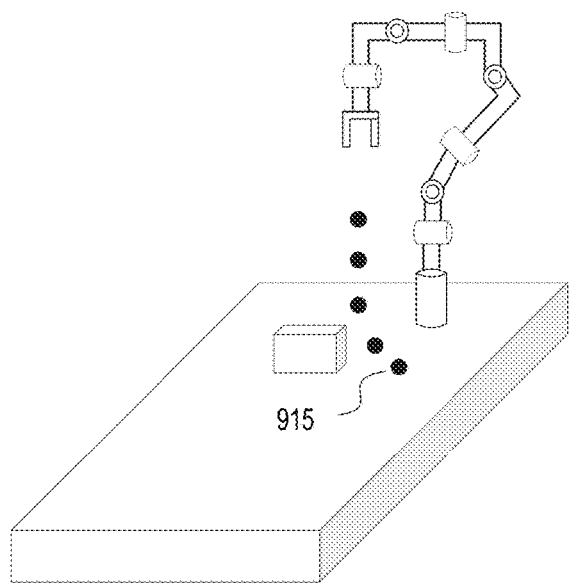
Figure 9D:
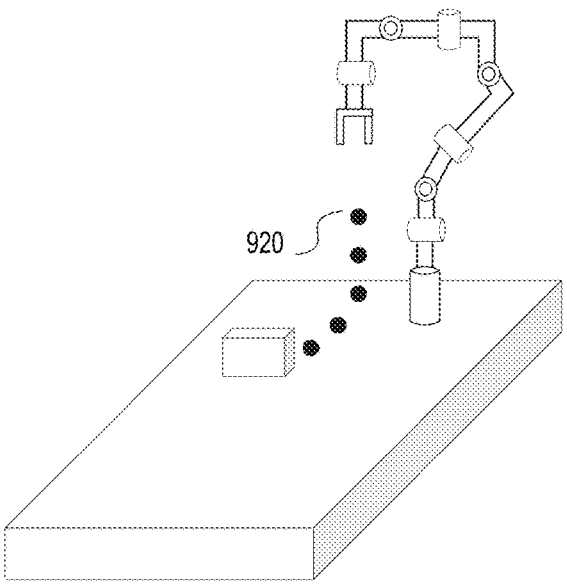

In accordance with an example embodiment, coverage is measured over a 50×50×50 $cm^3$ centered region that is discretized into 125 units of 10 $cm^3$ cubes each. The performance is evaluated by rolling out 100 trajectories per method that is repeated for 4 seeds and visualizing the mean and standard deviation of the number of cubes covered by the object during the rollouts. Safety is measured as the ratio of safe states according to the indicator function namely $r_{safety}$, that is encountered during the rollouts. Both measures are visualized as violin plots as shown in FIG. 8A and FIG. 8B that demonstrate that the coverage of the baseline SLIM embodiment is approximately the same as that of the SLIM_no_s embodiment; but it is significantly superior in terms of the safety measure that show the benefit of including $r_{safety}$ reward function. The baseline SLIM significantly outperforms all its variations both in terms of coverage and safety measures.

Various embodiments disclosed herein pertain to executing downstream tasks, such as tasks focusing on the operational aspects that are considered after the preliminary phases such as locating, perceiving, or planning. It will be appreciated that disclosures can be extended to incorporate and/or perform upstream tasks, which may result in covering the complete task spectrum. In one embodiment, when a robotic device has performed upstream tasks, the baseline SLIM offers safe and efficient motor primitives for solving downstream tasks such as matching position and orientation to follow a safe object-trajectory. For example, if a robotic device is a robotic manipulation system, then upstream tasks may be identifying and locating an object, and a downstream task may involve learning behaviors like reaching, grasping, lifting, pushing, displacing and the like and executing them to achieve the objective.

The utilization of the present baseline SLIM embodiment, in accordance with the example implementation of FIG. 6, can be illustrated by deploying it as a motor primitive (for basic movement patterns or actions) over several types of trajectories, thereby analyzing the cumulative impact of errors on the performance of the baseline embodiment. Different trajectories of five ordered points are defined in position-representing space in case of the cartesian space for a robotic device for manipulation are illustrated in FIG. 9A, FIG. 9B, FIG. 9C, and FIG. 9D. The trained model implements the position-matching policy to follow a trajectory by sequentially selecting the points in the given order as position-matching goal for the policy. The skill discovery performance of the baseline SLIM is to follow these defined point trajectories and evaluate the performance using four metrics: (1) overall success is a percentage of success in following a trajectory by reaching all the points above a given distance threshold (e.g., 5 cm); (2) maximum distance, measured in meters, indicates the maximum distance between the object and the current waypoint in all phases of following a trajectory; (3) points success are the total number of points that have been successfully reached in a trajectory; and (4) safety rate is a percentage indicating the ratio of safe states that are encountered during the following of a trajectory over all states. The results for a total of six defined trajectories in terms of these metrics are shown in Table 2. The results suggest that SLIM-based motion primitives (basic movement patterns learned through skill discovery) can be leveraged by planning techniques. The uncertainty (±) associated with the max distance metric is relatively small suggesting that these motor primitives are inherently safe. This enables a robotic device to follow complex trajectories over single or multiple objects while also meeting the safety criteria.

The performance evaluation of a trajectory-following task can be extended one step further by evaluating the ability to solve complex downstream tasks involving multiple objects. Self-supervised safe-skill discovery for trajectory following, as described in the present disclosure, can be deployed by arranging a set of three cubes into various configurations namely: (a) Line, where the cubes are aligned to the horizontal axis; and (b) Pyramid, where a base is formed with two cubes and a third cube is placed over this base. For each cube, a trajectory is planned to reach an end position in a desired configuration and then sequentially execute the trajectory following policy. The results in terms of the metrics for this configuration are also tabulated in Table 2. Points success metric for this case refers to the number of cubes correctly placed in the final pose for a desired configuration.

Overall, different variations of SLIM, as described herein, show the importance of each component to obtain diverse yet interactive and safe manipulation behaviors. The three reward components are deployed to achieve the desired behaviors. In the first group, combining these three components using normalized or unnormalized sums results into an inefficient performance due to the possible interferences between the reward signal while learning a skill-conditioned policy. Utilizing the multi-critic architecture with dedicated critics for each reward component can alleviate this problem and bring stability in learning a policy. Furthermore, for the second group, the multi-critic scheme helps with combining different reward components, as omission of any of the three rewards can reduce the efficiency of the disclosed technique.

Within different embodiments of the example implementations as described herein, reinforcement learning can be employed to adapt control strategy models that are deployed in a real-world setting. They can be modeled first in a virtual or a simulation environment to enhance their performance by feeding them with the trajectories data when the failures happen in real world settings. Subsequently, the updated enhanced models can be redeployed on the control systems in the real-world setting without compromising the efficiency of operations. Such example implementations show significant improvements in the performance, and they do not need a monitoring system or reinforcement learning to update the control strategy models. Existing implementations require stopping the operations of a robotic device to reconfigure the control strategy model and recreate the prior diverse scenarios and then redeploy them in the real-world environment. By monitoring the operational efficacy of the robots within the real-world setting and providing the identified failure scenarios to a training server responsible for a simulation environment, this simulation environment can subsequently enable the system to tolerate and respond to faults, thereby gradually reducing the downtime of robotic manipulation system and improving the productivity of the robotic devices or system in the real-world environment.

Figure 10:
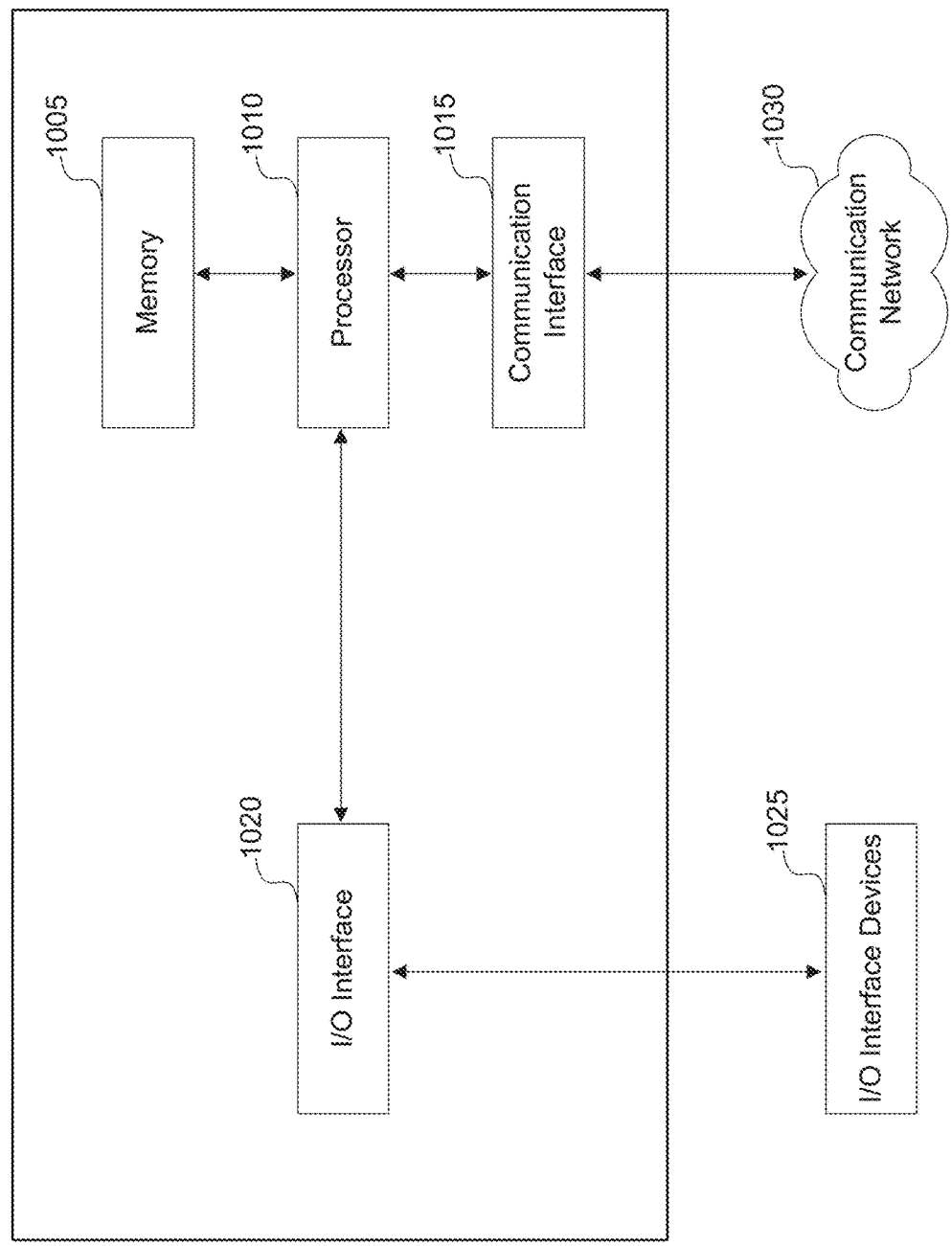
FIG. 10 schematically illustrates an example architecture of a computing system that can implement at least one example of disclosed SLIM method.

FIG. 10 is a block diagram of an example computing system 1000 that may be utilized to perform one or more aspects of the disclosure described herein. For example, in some implementations, computing system 1000 may be utilized to generate, train, and/or deploy a model to determine one or more actions or a sequence of actions of a robotic device. The computing system 1000 typically includes at least one processor 1010 that communicates with several peripheral devices via buses. These peripheral devices may further include, for example, a memory 1005 (e.g., RAM, a magnetic hard disk or an optical storage disk),

TABLE 2

| Trajectory | Overall Success (%) | Max Distance (m) | Points Success | Safety Rate |
|---|---|---|---|---|
| 1 | 100 | 0.04 ± 0.00 | 5 ± 0.00 | 100 |
| 2 | 100 | 0.04 ± 0.00 | 5 ± 0.00 | 100 |
| 3 | 80 | 0.05 ± 0.03 | 4.5 ± 1.20 | 99.97 |
| 4 | 60 | 0.07 ± 0.04 | 4.4 ± 0.91 | 100 |
| 5 | 80 | 0.12 ± 0.20 | 4.2 ± 1.66 | 100 |
| 6 | 80 | 0.05 ± 0.02 | 4.7 ± 0.64 | 100 |
| Line | 100 | 0.034 ± 0.009 | 3.0 ± 0.00 | 100 |
| Pyramid | 80 | 0.048 ± 0.014 | 2.8 ± 0.60 | 99.98 |

I/O interface devices 1025 via I/O interface 1020 and a communication network 1030 via communication interface 1015.

The input and output interface devices 1025 allow user interaction with computing system 1000. Input interface devices may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing system 1000 or onto a communication network 1030. Output interface devices may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1000 to the user or to another machine or computing device.

Communication interface 1015 provides an interface to communication networks 1030 and is coupled to corresponding interface devices in other computing devices. Some of the examples of communication interfaces 1015 are a modem, digital subscriber line ("DSL") card, cable modem, network interface card, wireless network card, or other interface device capable of wired, fiber optic, or wireless data communications.

Storage systems store programming and data constructs that provide the functionality of some, or all the modules described herein. These software modules are generally executed by processor 1010 alone or in combination with other processors. Memory 1005 used in computing system 1000 can include several memories including a main random-access memory (RAM) for storage of instructions and data during program execution, a mass storage device that provides persistent storage for program and data files, and may include a hard disk drive, a floppy disk drive along with associated removable media, a CD-ROM drive, a read only memory (ROM) in which fixed instructions are stored, an optical drive, or removable media cartridges. The modules implementing the functionality of certain implementations may be stored in the mass storage system, or in other machines accessible by the processor(s) 1010 via I/O interface 1020.

Computing system 1000 can be of varying types including a workstation, server, computing cluster, blade server, server farm, or any other data processing system or computing device. Due to the ever-changing nature of computers and networks, the description of computing system 1000 depicted in FIG. 10 is intended only as a specific example for purposes of illustrating some implementations. Many other configurations of computing system 1000 are possible having more or fewer components than the computing device depicted in FIG. 10.

Figure 11:
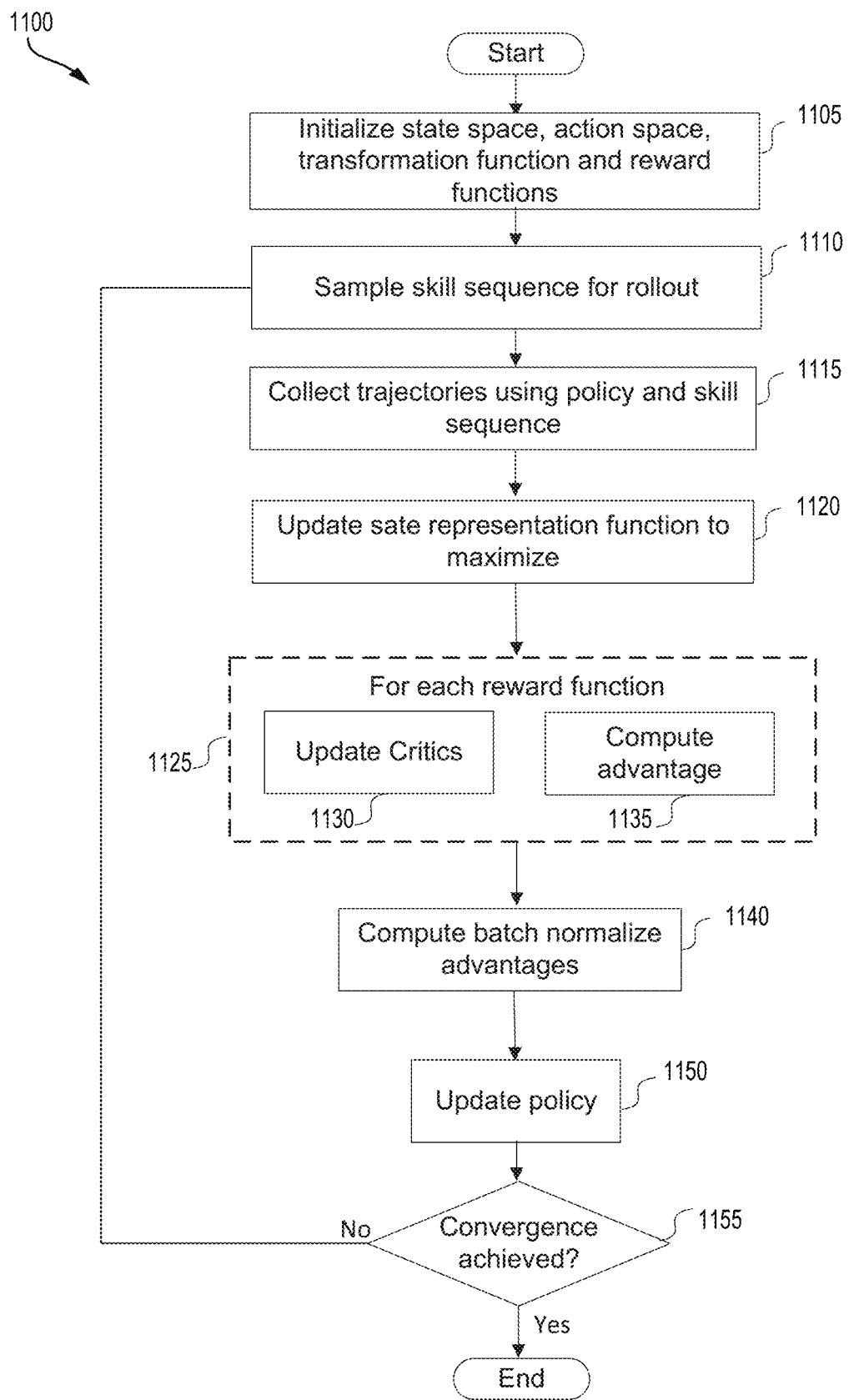
FIG. 11 illustrates an example flow of a method of determining a policy of a robotic device according to an example embodiment.

FIG. 11 illustrates an example flow of a method of determining an action of a robotic device for learning a policy according to an example embodiment. Hereinafter, a method of training a model that is used to determine an action of a robotic device for a situation (e.g., to perform a task) is further described with reference to FIG. 11. Referring to FIG. 11, at block 1105, the model can be initialized by defining, for example, state space, action space, transformation function and reward functions where objective functions of the reward functions for each associated critic are described above. The sequence of skills is sampled for rollout at block 1110 that the robotic device will be performing later. The term "rollout" may represent executing the learned sequence of skills in a real or virtual environment for observing the outcome. Each skill or sequence of skills is associated with accomplishing a particular task or achieving a certain state (or goal). Each rollout may include an experiment or a trial to analyze how well the system is performing. At block 1120, the state representation space of's) is updated to maximize the reward functions. The state representation space is a mathematical abstraction used to describe the possible states of the robotic device. The state representation space represents the relevant information needed to characterize a configuration or state of the robotic device. This information can include positions and orientations of robot joints, a location of each of one or more objects in the environment, one or more sensor readings, a velocity of an object or of part or all of the robotic device, etc. The state representation space can be continuous, discrete, or a combination of both.

The trajectories followed by the robotic device are collected using policies $\pi_\theta$ and sequence of skills $(z_1, z_2)_n$ at block 1115 to learn a latent variable skill-conditioned policy $\pi(a|s, z)$. At block 1130, the value function V is learned for a reward function of a critic using respective objective functions followed by computing the advantage at block 1135. The process 1125 is repeated for each critic and the associated reward function. The advantage $A_m$ is a measure of how good or bad an action is compared to the average of actions which could be taken in terms of the expected future rewards. The advantage $A_m$, computed using generalized advantage estimation (GAE), measures the relative value of taking a specific action a in a particular state s over the average value of all possible actions in that state. The subsequent block 1140 performs a batch normalization of the computed advantages $A_m$ from each critic before combining with the weights for learning of policy. The example implementation, as described herein, uses equal weights to combine the normalized advantages. The policy $\pi_\theta$ is updated at block 1150 using proximal policy optimization (PPO), a policy gradient method that provides stability and reliability associated with the training policies. It works by limiting the change in policy at each update step so that the new or updated policy does not deviate significantly from the old policy. The decision block 1155 checks for the convergence of the process, and if the convergence of policy is not achieved, it repeats the process again at block 1110. If the convergence is achieved, then the process ends and outputs the skill-conditioned policy.

Figure 12:
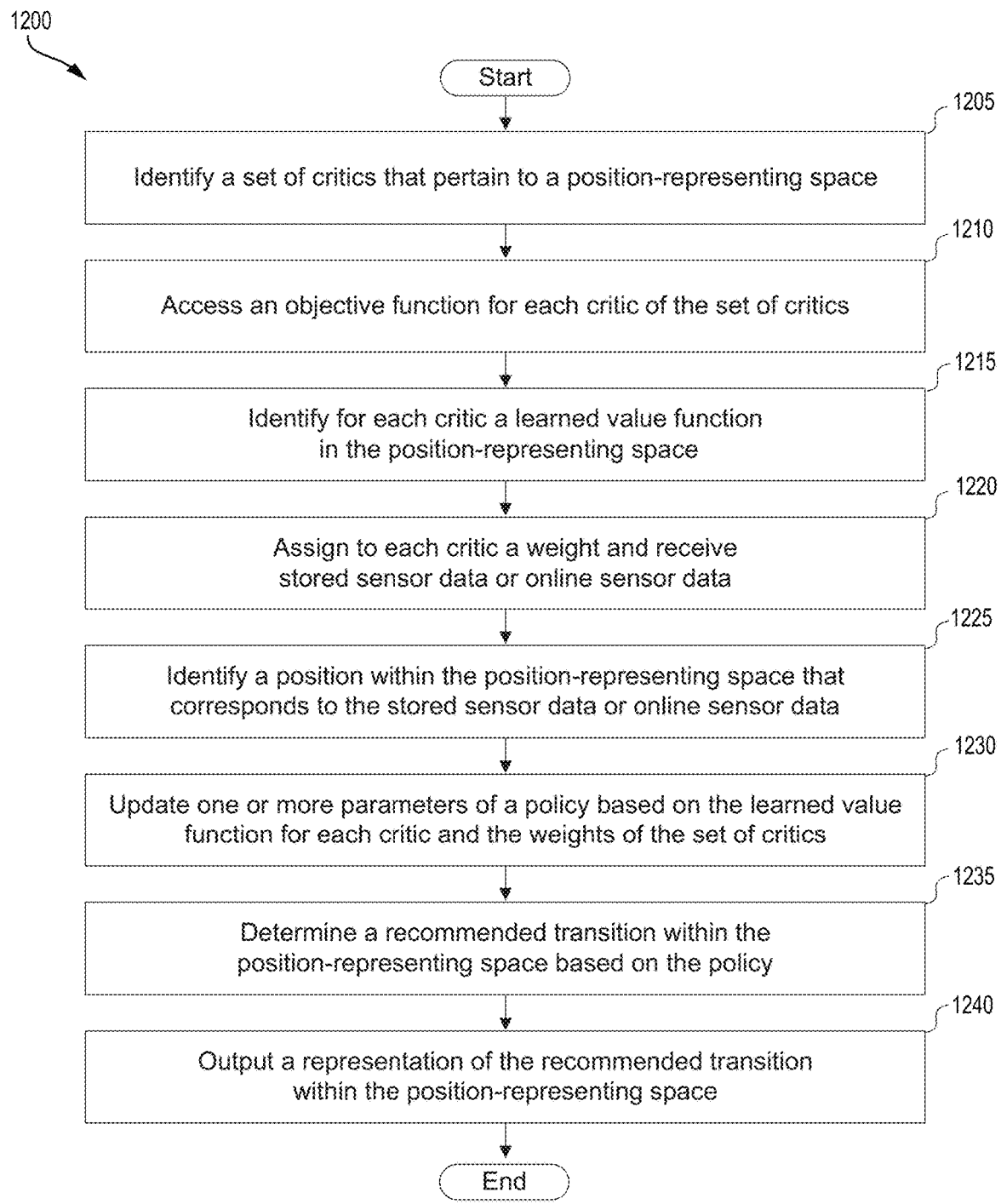
FIG. 12 illustrates an example flow of a method of determining and updating a policy in accordance with an embodiment of the present disclosure.

FIG. 12 illustrates an example flowchart of a computer implemented method 1200 according to an example embodiment. Referring to FIG. 12, at block 1205, a set of critics is identified that pertain to a position-representing space, where each of the set of critics corresponds to a different objective function, and where the set of critics includes a first critic, a second critic, and a third critic. At block 1210, the objective function for each critic of the set of critics is accessed and this includes accessing an objective function of the first critic that is based on a reach-reward objective configured to be anti-correlated with an extent of a movement from an initial to a target position within a position-representing space, accessing an objective function of the second critic that is based on a discovery-component objective configured to be correlated with an extent to which the movement triggers expansion of a bound or volume of the position-representing space, and accessing an objective function of the third critic that is based on a safety-component objective that is configured to be anticorrelated with an extent to which any of one or more safety constraints are violated during or at a completion of the movement.

At block 1215, for each critic of the set of critics, a learned value function is identified in the position-representing space that is based on the objective function of the critic. At block 1220, a weight is assigned to each critic of the set of critics and the stored sensor data or online sensor data is received. At block 1225, a position within the position-representing space is identified that corresponds to the stored sensor data or online sensor data. At block 1230, one or more parameters of the policy are updated to improve the recommended transition in the next iteration. The policy is updated based on the learned value function for each critic and the weights of the set of critics. At block 1235, based on the policy, a transition is recommended within the position-representing space. At block 1240, a representation of the recommended transition within the position-representing space is sent as an output.

For a skill composition, individual skills or behaviors are combined or sequenced to solve complex tasks for a robotic device. In the example embodiment of the present disclosure, the skill composition can be performed by selecting a sequence of skills to execute in each occurrence to allow for learning a composition of safe skills.

The skill learned robotic manipulation device introduced in the example implementation herein can be utilized in any application of manufacturing, warehousing, material handling and other applications that involve robotic assistance to accomplish tasks.

The devices and/or apparatuses described herein may be implemented through the hardware components and software components, and/or a combination thereof. For example, a device may be implemented utilizing one or more general-purpose or special purpose computers, such as, for example, processors, controllers, an arithmetic an logic units (ALUs), application specific integrated circuits (ASICs), digital signal processors (DSPs), digital signal processing devices (DSPDs), programmable logic devices (PLDs), field programmable gate arrays (FPGAs), microcontrollers, microprocessors, programmable logic units (PLUS) or any other electronic device designed to perform the functions described above. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

Furthermore, when implemented in software, firmware, middleware, scripting language, and/or microcode, the program code or code segments to perform the necessary tasks can be stored in a machine-readable medium such as a storage medium. The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Some embodiments of the present disclosure include a system including one or more data processors. In some embodiments, the system includes a non-transitory computer readable storage medium containing instruction which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein. The media may also include, alone or in combination with the program instructions, data files, data structures, and the like. The media may continuously store computer executable programs or may temporarily store the same for execution or download. Also, the media may be several types of recording or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Software codes can be stored in a memory that can be implemented within the processor or external to the processor. As used herein the term "memory" refers to any type of long term, short term, volatile, nonvolatile, or other storage medium and is not to be limited to any memory or number of memories, or type of media upon which memory is stored. Examples of a program instruction may include a machine language code produced by a compiler and a high-language code executable by a computer using an interpreter.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the systems and methods as claimed have been specifically disclosed by embodiments and optional features, modification and variation of the concepts herein disclosed may be resorted to by those skilled in the art, and that such modifications and variations are considered to be within the scope of such systems and methods as defined by the appended claims.

The present description provides preferred exemplary embodiments only, and is not intended to limit the scope, applicability, or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

What is claimed is:

1. A computer-implemented method, comprising:
identifying a set of critics that pertain to a position-representing space, wherein each of the set of critics corresponds to a different objective function, and wherein the set of critics includes a first critic, a second critic, and a third critic;
accessing an objective function of the first critic that is based on a reach-reward objective configured to be anti-correlated with an extent of a movement from an initial position to a target position within the position-representing space;
accessing an objective function of the second critic that is based on a discovery-component objective configured to be correlated with an extent to which the movement triggers expansion of a bound or volume of the position-representing space; and
accessing an objective function of the third critic that is based on a safety-component objective that is configured to be anticorrelated with an extent to which any of one or more safety constraints are violated during or at a completion of the movement;
identifying, for each critic of the set of critics, a learned value function in the position-representing space that is based on the objective function of the critic;
assigning, to each critic of the set of critics, a weight;
receiving sensor data;
identifying a position within the position-representing space that corresponds to the received sensor data;
updating a policy based on the learned value function for each critic of the set of critics and the weights of the set of critics, wherein the policy corresponds to a movement objective in the position-representing space;
determining, based on the policy, a recommended transition within the position-representing space from the initial position to the target position; and
outputting a representation of the recommended transition within the position-representing space.

2. The computer-implemented method of claim 1, further comprising:
learning, for each of the set of critics, the learned value function using the objective function of the critic.

3. The computer-implemented method of claim 1, further comprising:
computing, for each of the set of critics, an advantage of the learned value function using a generalized advantage estimation by measuring a relative value of taking a specific action in a particular state over the statistical value representative of a likelihood of each of a set of actions in the particular state.

4. The computer-implemented method of claim 1, further comprising:
performing, for each of the set of critics, a batch normalization of an advantage before combining with weights.

5. The computer-implemented method of claim 1, wherein each of the set of critics is assigned a same weight.

6. The computer-implemented method of claim 1, wherein outputting the representation of the recommended transition triggers a movement of a robotic device that accords with the recommended transition.

7. The computer-implemented method of claim 1, further comprising:
updating, the policy using proximal policy optimization (PPO), a policy gradient method that addresses stability and reliability issues associated with training policies, wherein the proximal policy optimization is configured to limit a change in the movement objective at each update step.

8. The computer-implemented method of claim 1, wherein the sensor data is stored sensor data or online sensor data.

9. A system comprising:
one or more data processors; and
a non-transitory computer readable storage medium containing instructions which, when executed on the one or more data processors, cause the one or more data processors to perform actions including:
identifying a set of critics that pertain to a position-representing space, wherein each of the set of critics corresponds to a different objective function, and wherein the set of critics includes a first critic, a second critic, and a third critic;
accessing an objective function of the first critic that is based on a reach-reward objective configured to be anti-correlated with an extent of a movement from an initial position to a target position within the position-representing space;
accessing an objective function of the second critic that is based on a discovery-component objective configured to be correlated with an extent to which the movement triggers expansion of a bound or volume of the position-representing space; and
accessing an objective function of the third critic that is based on a safety-component objective that is configured to be anticorrelated with an extent to which any of one or more safety constraints are violated during or at a completion of the movement;
identifying, for each critic of the set of critics, a learned value function in the position-representing space that is based on the objective function of the critic;
assigning, to each critic of the set of critics, a weight;
receiving sensor data;
identifying a position within the position-representing space that corresponds to the received sensor data;
updating a policy based on the learned value function for each critic of the set of critics and the weights of the set of critics, wherein the policy corresponds to a movement objective in the position-representing space;
determining, based on the policy, a recommended transition within the position-representing space from the initial position to the target position; and
outputting a representation of the recommended transition within the position-representing space.

10. The system of claim 9, further comprising:
learning, for each of the set of critics, the learned value function using the objective function of the critic.

11. The system of claim 9, further comprising:
computing, for each of the set of critics, an advantage of the learned value function using a generalized advantage estimation by measuring a relative value of taking a specific action in a particular state over the statistical value representative of a likelihood of each of a set of actions in the particular state.

12. The system of claim 9, further comprising:
performing, for each of the set of critics, a batch normalization of the advantage before combining with weights.

13. The system of claim 9, wherein each of the set of critics is assigned a same weight.

14. The system of claim 9, wherein outputting the representation of the recommended transition triggers a movement of a robotic device that accords with the recommended transition.

15. The system of claim 9, wherein a state space, an action space, transformation function and objective functions are defined.

16. The system of claim 9, wherein the sensor data is stored sensor data or online sensor data.

17. A computer-implemented method for learning a policy to recommend transitions in a position-representing space for a robotic device, comprising:
accessing, with one or more processors, a set of reward functions of a multi-critic architecture having a set of critics, wherein each critic of the set of critics is associated with a reward function of the set of reward functions that is one of: (i) a safety reward function; (ii) an exploration reward function; and (iii) an accuracy reward function; and
learning, with one or more processors, the policy based on learned value functions associated with the set of critics; wherein said learning includes iteratively performing a set of operations until convergence of a set of parameters of the policy is detected, wherein the set of operations includes:
sampling a sequence of skills for one or more rollouts of the policy, wherein the accuracy reward function assesses performance of the sequence of skills;
collecting one or more trajectories, wherein each of the one or more trajectories is a trajectory of part or all of a robotic device that has or is to have its movement evaluated using the policy or is a trajectory of an object moved by the robotic device;
updating, based on the one or more trajectories, a state representation space that is received as input to the learned value functions associated with the set of critics and that represents: (i) potential positions of part or all of the robotic device and/or of the object moved by the robotic device; and/or (ii) potential velocities of part or all of the robotic device and/or of the object moved by the robotic device;
updating the learned value functions associated with the set of critics using the updated state representation space;
computing, for each of the set of critics, an advantage of a given potential action relative to other potential actions using an advantage function associated with the critic;
generating an advantage score by normalizing and combining the advantages of the set of critics; and
updating the set of policy parameters based on the advantage score.

18. The computer-implemented method of claim 17, wherein: (i) the safety reward function is based on a safety-component objective that is configured to be anticorrelated with an extent to which any of one or more safety constraints are violated during or at a completion of a movement of part or all of the robotic device; (ii) the exploration reward function is based on a discovery-component objective configured to be correlated with an extent to which the movement of part or all of the robotic device triggers expansion of a bound or volume of the position-representing space; and (iii) the accuracy reward function is based on a reach-reward objective configured to be anti-correlated with an extent to which a post-transition position associated with the robotic device or with the object differs from a target position thereof in the position-representing space.

19. A computer-implemented method for using a policy to recommend transitions in a position-representing space for a robotic device, the computer-implemented method comprising:
receiving, with one or more processors, a representation of a task for the robotic device;
computing, using the policy, a set of recommended transitions in the position-representing space for performing the task; and
triggering a movement of the robotic device by initiating the set of recommended transitions;
wherein the policy is trained by:
accessing, with one or more processors, a set of reward functions of a multi-critic architecture having a set of critics, wherein each critic of the set of critics is associated with a reward function of the set of reward functions that is one of: (i) a safety reward function; (ii) an exploration reward function; and (iii) an accuracy reward function; and
learning, with one or more processors, the policy based on learned value functions associated with the set of critics; wherein said learning includes iteratively performing a set of operations until convergence of a set of parameters of the policy is detected, wherein the set of operations includes:
sampling a sequence of skills for one or more rollouts of the policy, wherein the accuracy reward function assesses performance of the sequence of skills;
collecting one or more trajectories, wherein each of the one or more trajectories is a trajectory of part or all of a robotic device that has or is to have its movement evaluated using the policy or is a trajectory of an object moved by the robotic device;
updating, based on the one or more trajectories, a state representation space that is received as input to the learned value functions associated with the set of critics and that represents: (i) potential positions of part or all of the robotic device and/or of the object moved by the robotic device; and/or (ii) potential velocities of part or all of the robotic device and/or of the object moved by the robotic device;
updating the learned value functions associated with the set of critics using the updated state representation space;
computing, for each of the set of critics, an advantage of a given potential action relative to other potential actions using an advantage function associated with the critic;
generating an advantage score by normalizing and combining the advantages of the set of critics; and
updating the set of policy parameters based on the advantage score.

20. The computer-implemented method of claim 19, wherein: (i) the safety reward function is based on a safety-component objective that is configured to be anticorrelated with an extent to which any of one or more safety constraints are violated during or at a completion of a movement of part or all of the robotic device; (ii) the exploration reward function is based on a discovery-component objective configured to be correlated with an extent to which the movement of part or all of the robotic device triggers expansion of a bound or volume of the position-representing space; and (iii) the accuracy reward function is based on a reach-reward objective configured to be anti-correlated with an extent to which a post-transition position associated with the robotic device or with the object differs from a target position thereof in the position-representing space.

* * * * *